United States Patent
Bonificio et al.

(10) Patent No.: US 9,850,555 B2
(45) Date of Patent: Dec. 26, 2017

(54) SYSTEMS AND METHODS FOR SEPARATING AND RECOVERING RARE EARTHS

(71) Applicant: President and Fellows of Harvard College, Cambridge, MA (US)

(72) Inventors: William Daley Bonificio, Cambridge, MA (US); David Clarke, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 14/772,861

(22) PCT Filed: Mar. 10, 2014

(86) PCT No.: PCT/US2014/022253
§ 371 (c)(1),
(2) Date: Sep. 4, 2015

(87) PCT Pub. No.: WO2014/150110
PCT Pub. Date: Sep. 25, 2014

(65) Prior Publication Data
US 2016/0017459 A1 Jan. 21, 2016

Related U.S. Application Data

(60) Provisional application No. 61/790,071, filed on Mar. 15, 2013.

(51) Int. Cl.
*C22B 59/00* (2006.01)
*C22B 3/18* (2006.01)
*B09C 1/10* (2006.01)
*C22B 7/00* (2006.01)

(52) U.S. Cl.
CPC ............. *C22B 59/00* (2013.01); *B09C 1/10* (2013.01); *C22B 3/18* (2013.01); *C22B 7/006* (2013.01); *Y02P 10/234* (2015.11); *Y02P 10/238* (2015.11)

(58) Field of Classification Search
None
See application file for complete search history.

(56) References Cited

U.S. PATENT DOCUMENTS

| | | | |
|---|---|---|---|
| 4,320,093 | A | 3/1982 | Volesky et al. |
| 6,582,939 | B1 | 6/2003 | Binder et al. |
| 2012/0024795 | A1 | 2/2012 | Tadic et al. |
| 2013/0078707 | A1* | 3/2013 | Rivasseau ............... B09C 1/10 435/257.1 |

OTHER PUBLICATIONS

Vijayaraghavan et al., "Interaction of rare earth elements with a brown marine alga in multi-component solutions", Desalination 2011, vol. 265, pp. 54-59.*
International Search Report and Written Opinion dated Jul. 22, 2014 for Application No. PCT/US2014/022253.
International Preliminary Report on Patentability dated Sep. 24, 2015 for Application No. PCT/US2014/022253.
Diniz et al., Biosorption of La, Eu and Yb using Sargassum biomass. Water Res. Jan. 2005;39(1):239-47.
Sakamoto et al., Biosorption of uranium and rare Earth elements using biomass of algae. Bioinorg Chem Appl. 2008:706240. doi: 10.1155/2008/706240. Epub Dec. 1, 2008. 9 pages.
[No Author Listed], Resource Processing. In: Extractive Metallurgy of Rare Earths. 2004. 1st Ed. Chapter 3: 132-200.
Andrés et al., Rare Earth Elements Removal by Microbial Biosorption: A Review. Environ Technol. Nov. 2003;24(11):1367-75.
Andrès et al., Removal of Rare Earth Elements and Precious Metal Species by Biosorption. In: Microbial Biosorption of Metals. 2011. Kotrba et al., Eds. Chapter 8: 179-196.
Takahashi et al., Adsorption of rare earth elements onto bacterial cell walls and its implication for REE sorption onto natural microbial mats. Chemical Geology 2005;219:53-67.
Texier et al., Selective Biosorption of Lanthanide (La, Eu, Yb) Ions by Pseudomonas aeruginosa. Environ Sci Technol. 1999;33:489-495.
Volesky et al., Biosorption of Heavy Metals. Biotechnol Prog. 1995;11:235-250.

* cited by examiner

*Primary Examiner* — Michelle F Paguio Frising
(74) *Attorney, Agent, or Firm* — Wolf, Greenfield & Sacks, P.C.

(57) ABSTRACT

The present application is generally directed to separation and recovery of rare earths using biomass, liposomes, and/or other materials. In some embodiments, a composition comprising rare earths is exposed to biomass, where some of the rare earths are transferred to the biomass, e.g., via absorption. The composition may then be separated from the biomass. A solution may be exposed to the biomass thereby enriching the solution in one or more rare earths, relative to other rare earths in the biomass. The solution and the biomass may then be separated, and the rare earths recovered from the solution. In some cases, this process may be repeated with different solutions, which may result in different solutions enriched in various rare earths. Similar processes may be used to separate the rare earths from thorium and uranium. Liposomes may be used instead of and/or in addition to biomass.

15 Claims, 18 Drawing Sheets

SYSTEMS AND METHODS FOR SEPARATING AND RECOVERING RARE EARTHS

RELATED APPLICATIONS

This application is a national stage filing under 35 U.S.C. §371 of International Application No. PCT/US2014/022253, filed Mar. 10, 2014, entitled "Systems and Methods for Separating and Recovering Rare Earths," by Bonificio, et al., which claims the benefit of U.S. Provisional Patent Application Ser. No. 61/790,071, filed Mar. 15, 2013, entitled "Systems and Methods for Separating and Recovering Rare Earths," by Bonificio, et al., each of which is incorporated herein by reference.

GOVERNMENT SPONSORSHIP

Certain aspects of the present invention were made with Government support under Grant No. N00014-11-1-0894, awarded by the U.S. Navy. The U.S. Government has certain rights in this invention.

TECHNICAL FIELD

Systems and methods for the separation and recovery of rare earths using biomass, liposomes, and/or other materials are generally described.

BACKGROUND

Rare earths are utilized in numerous commercial products, such as phosphors for lighting, anodic materials for nickel metal hydride batteries, and permanent magnets for electric motors and generators. The recovery and separation of rare earths from natural sources is complicated by the presence of multiple rare earths in most sources, and the chemical similarities between the rare earths. Rare earths are typically found together in minerals, such as bastnaesite, monazite, and xenotime. Many rare earths are similar in features that are typically used for separation, such as elemental size, density, reduction potential, oxidation potential, melting point, and boiling points. Often, low separation factors are achieved for the separation of individual rare earths.

In conventional industrial rare earth recovery processes, rare earth ore is mined from the ground and crushed into a powder. This powder is passed through a series of flotations that separate out waste from the rare earth minerals to form a rare earth concentrate. The rare earth concentrate is chemically processed to remove impurities (e.g., Sr, Th, U, and Ca). Cerium, the most abundant rare earth, can be isolated in its tetravalent state and recovered through oxidization to $CeO_2$. The remaining rare earths undergo a series of dissolutions and precipitations to form purified rare earth chlorides. Liquid-liquid extractions are typically used to separate the individual rare earths. Often, a series of extractions are first used to separate the rare earths into groups containing 3 or 4 rare earths. Then, each group undergoes additional extractions to isolate individual rare earths. In some instances, the separation of rare earths using conventional industrial methods may use at least 750 stages of different liquid-liquid extractions, each often requiring large volumes of harsh chemicals.

Accordingly, improved methods are needed to separate rare earths.

SUMMARY

Systems and methods for the separation and recovery of metals using biomass, liposomes, and/or other materials are provided. The subject matter of the present invention involves, in some cases, interrelated products, alternative solutions to a particular problem, and/or a plurality of different uses of one or more systems and/or articles.

According to some embodiments, the present invention is directed to various methods. In one set of embodiments, the method comprises providing biomass comprising an initial molar ratio of a first rare earth to a second rare earth and exposing the biomass to a first solution to cause the first solution to have a first molar ratio of first rare earth to second rare earth. The method also comprises, in some cases, removing at least a portion of the first solution and exposing the biomass to a second solution different from the first solution to cause the second solution to have a second molar ratio of first rare earth to second rare earth.

The method, in another set of embodiments, comprises providing biomass comprising an initial molar ratio of a first rare earth to a second rare earth and exposing the biomass to a first solution comprising non-hydrogen ions to cause the first solution to have a first molar ratio of first rare earth to second rare earth. The method also comprises, in some cases, removing at least a portion of the first solution and exposing the biomass to a second solution comprising non-hydrogen ions different from the first solution to cause the second solution to have a second molar ratio of first rare earth to second rare earth.

In one set of embodiments, the present invention is directed to a method comprising passing an initial solution comprising a molar ratio of first and second rare earths through a plurality of stages in a flow reactor, where in at least some of the stages, the rare earths are exposed to biomass such that the second rare earths have a greater affinity for biomass than the first rare earths. The method also comprises, in some cases, recovering, from the plurality of stages, an exiting solution having an increased molar ratio of first rare earth relative to the second rare earth, relative to the initial solution.

In certain cases, the present invention is directed to a method comprising culturing biomass in a solution comprising an initial molar ratio of a first rare earth to a second rare earth to cause the solution to have an increased molar ratio of the first rare earth to the second rare earth, relative to the initial molar ratio. The method also comprises, in some cases, removing at least a portion of the solution from the biomass.

In one set of embodiments, a method comprises providing biomass comprising an initial molar ratio of a first rare earth to uranium and/or thorium atoms and exposing the biomass to an ionic solution to cause the ionic solution to have an increased molar ratio of a first rare earth to uranium atoms and/or thorium atoms, relative to the initial molar ratio.

The present invention, in another set of embodiments, is directed to a method comprising culturing biomass in a solution comprising an initial molar ratio of a first rare earth to uranium and/or thorium atoms to cause the solution to have an increased molar ratio of a first rare earth to uranium and/or thorium atoms, relative to the initial molar ratio. The method also comprises, in some cases, removing at least a portion of the solution from the biomass.

In one set of embodiments, the method comprises providing biomass comprising an initial molar ratio of a first rare earth and a second rare earth, wherein the difference between the atomic number of the first rare earth and the second rare earth is less than or equal to 3. The method also comprises, in some cases, exposing the biomass to a plurality of solutions to separate the first rare earth from the second rare earth, wherein at least one of the solutions, after exposure to the biomass, contain a molar ratio of the first rare earth to the second rare earth that is greater than or equal to about 2 times the initial molar ratio.

In one set of embodiments, the method comprises exposing liposomes comprising an initial molar ratio of a first rare earth to a second rare earth to a first solution to cause the first solution to have a first molar ratio of first rare earth to second rare earth, removing at least a portion of the first solution, exposing the liposomes to a second solution different from the first solution to cause the second solution to have a second molar ratio of first rare earth to second rare earth.

The method, in accordance with another set of embodiments, comprises exposing liposomes comprising an initial molar ratio of a first rare earth to a second rare earth to a first solution comprising non-hydrogen ions to cause the first solution to have a first molar ratio of first rare earth to second rare earth, removing at least a portion of the first solution, and exposing the liposomes to a second solution comprising non-hydrogen ions different from the first solution to cause the second solution to have a second molar ratio of first rare earth to second rare earth.

The method, in yet another set of embodiments, includes passing an initial solution comprising a molar ratio of first and second rare earths through a plurality of stages in a flow reactor, wherein in at least some of the stages, the rare earths are exposed to liposomes such that the second rare earths have a greater affinity for liposomes than the first rare earths, and recovering, from the plurality of stages, a exiting solution having an increased molar ratio of first rare earth relative to the second rare earth, relative to the initial solution.

In still another set of embodiments, the method comprises providing liposomes comprising an initial molar ratio of a first rare earth and a second rare earth, wherein the difference between the atomic number of the first rare earth and the second rare earth is less than or equal to 3, and exposing the liposomes to a plurality of solutions to separate the first rare earth from the second rare earth, wherein at least one of the solutions, after exposure to the liposomes, contain a molar ratio of the first rare earth to the second rare earth that is greater than or equal to about 2 times the initial molar ratio.

In another set of embodiments, the method comprises acts of providing liposomes comprising an initial molar ratio of a first rare earth to uranium and/or thorium atoms; and exposing the liposomes to an ionic solution to cause the ionic solution to have an increased molar ratio of a first rare earth to uranium atoms and/or thorium atoms, relative to the initial molar ratio.

According to another set of embodiments, the present invention is directed to various systems. In one set of embodiments, the system comprises a flow reactor comprising biomass, an initial solution entering the reactor comprising a molar ratio of first and second rare earths, and an exiting solution exiting the reactor comprising an increased molar ratio of first rare earth relative to the second rare earth, relative to the initial solution.

The present invention, in yet another set of embodiments, is directed to a system, comprising a flow reactor comprising biomass, a source of an initial solution comprising at least first and second rare earths in fluid communication with the flow reactor, and a source of acid in fluid communication with the flow reactor.

In another set of embodiments, the system comprises a flow reactor comprising liposomes, an initial solution entering the reactor comprising a molar ratio of first and second rare earths, and an exiting solution exiting the reactor comprising an increased molar ratio of first rare earth relative to the second rare earth, relative to the initial solution. In yet another set of embodiments, the system comprises a flow reactor comprising liposomes; and a source of an initial solution comprising at least first and second rare earths in fluid communication with the flow reactor.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
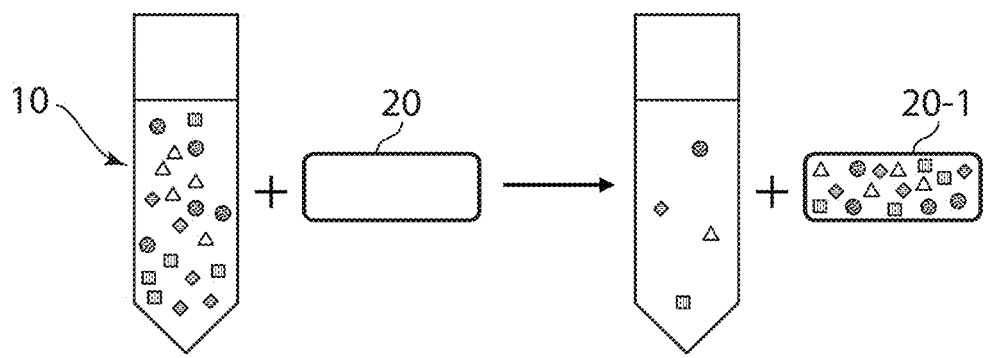
FIG. 1A-F illustrate the separation of various metals, according to certain embodiments.
Figure 1B:
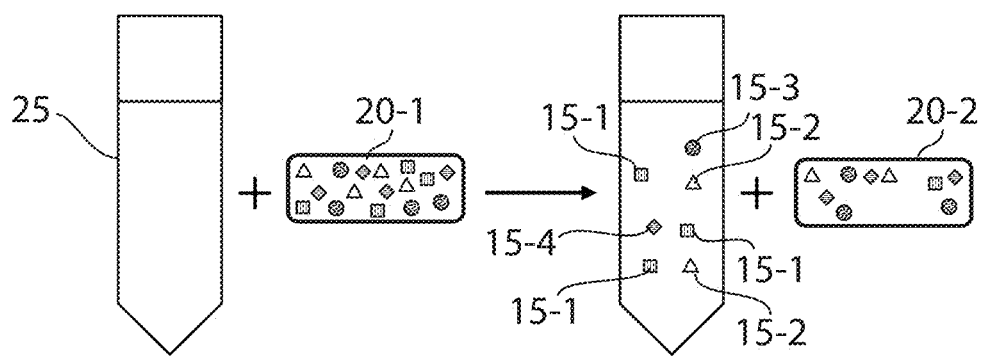

The present application is generally directed to separation and recovery of rare earths using biomass, liposomes, and/or other materials. In some embodiments, a composition comprising rare earths is exposed to biomass, where some of the rare earths are transferred to the biomass, e.g., via absorption. The composition may then be separated from the biomass. A solution may be exposed to the biomass, such that some of the rare earths are released from the biomass into the solution, thereby enriching the solution in one or more rare earths, relative to other rare earths in the biomass. The solution and the biomass may then be separated, and the rare earths recovered from the solution. In some cases, this process may be repeated with different solutions, e.g., having differences in pH or ionic concentration, which may result in different solutions enriched in various rare earths. In addition, in some embodiments, similar processes may be used to separate the rare earths from thorium and uranium. Also, in some embodiments, liposomes may be used instead of and/or in addition to biomass.

As mentioned above, certain materials such as biomass or liposomes may be exposed to a composition comprising rare earths, such that at least some rare earths are transferred to the materials, e.g., via adsorption. Without wishing to be bound by any theory, it is believed that some materials may have certain sites or locations which are able to bind to rare earths, where such binding sites have different binding pKa's to different rare earths. These different binding pKa's may result in different binding abilities for different rare earths, and in some cases, this can be controlled by controlling the pH as discussed herein.

A rare earth, as used herein, includes any chemical structure, such as atoms, ions, molecules, etc. comprising Sc, Y, La, Ce, Pr, Nd, Pm, Sm, Eu, Gd, Tb, Dy, Ho, Er, Tm, Yb, or Lu (i.e., atomic numbers 21, 39, and 57-71). In some cases, however, Sc and Y are not included. In some cases, the rare earths are rare earth elements or "REEs." As discussed herein, the biomass may be used to enrich a solution in one or more rare earths, relative to other rare earths. This may be determined, for example, by determining molar ratios, i.e., the ratio of the moles of the rare earth to the total moles of all the rare earths. The enrichment may occur because some of the rare earths may be preferentially or otherwise disproportionately transferred to and/or released from the biomass, relative to the other rare earths, and in some cases, this can be controlled, e.g., by controlling pH or ionic concentrations, as discussed herein.

Liposomes generally comprise lipids, such as phospholipids, having a head portion and a tail portion, typically assembled as a lipid bilayer. Usually, the head portion, is relatively hydrophilic, while the tail portion is relatively hydrophobic. In some cases, the head portions of the lipids forming the liposomes may have different binding pKa's to different rare earths, which can be used for rare earth separation, etc. as is discussed herein. Examples of liposomes include, but are not limited to, lipids with a phosphate head group (for example, 18:1, 1,2-dioleoyl-sn-glycero-3-phosphate).

A non-limiting example of a technique for separation of rare earths using biomass is shown in FIG. 1. It should be noted that in this example, biomass is used for illustrative purposes only; in other embodiments, other materials such as liposomes, or other materials exhibiting different binding pKa's to different rare earths, may be used instead of and/or in addition to biomass. As illustratively shown in FIG. 1A, a composition 10 may comprise different rare earths (i.e., having different atomic numbers), as symbolically indicated by the circles, triangles, diamonds, and squares for purposes of explanation; in other embodiments, there may be more or fewer rare earths that are to be separated. The composition may be, for example, a liquid or a solution, a sludge or a slurry, or the like, that may contain one or more rare earths to be separated. The composition 10 is exposed to biomass 20, such that rare earths are transferred to biomass 20 forming a biomass 20-1 comprising the rare earths (as mentioned, in other embodiments, liposomes or other materials may be used in addition or instead of biomass). In some instances, however, a portion of the rare earths may remain in the composition, as is shown in FIG. 1A. In addition, in some cases, the biomass may be pre-protonated by exposure of the biomass to a suitable acid, e.g., nitric acids or other acids described herein.

In some embodiments, biomass 20-1 is then exposed to a solution 25. In some cases, solution 25 may have a different pH or ionic concentration than composition 10. Exposing biomass 20-1 to solution 25 causes some of the rare earths to be preferentially released from the biomass into solution 25, e.g., such that the molar ratio of a first rare earth 15-1 is greater than a second rare earth 15-2 in solution 25 relative to biomass 20-1. Other rare earths may also remain with biomass 20-2.

Figure 1C:
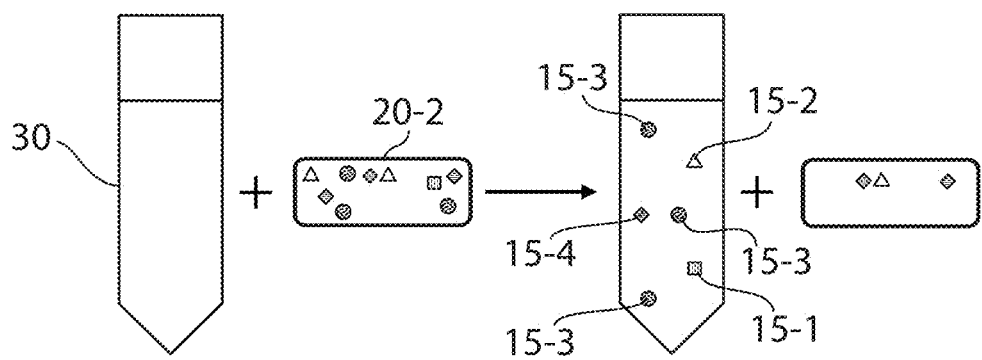
Figure 1D:
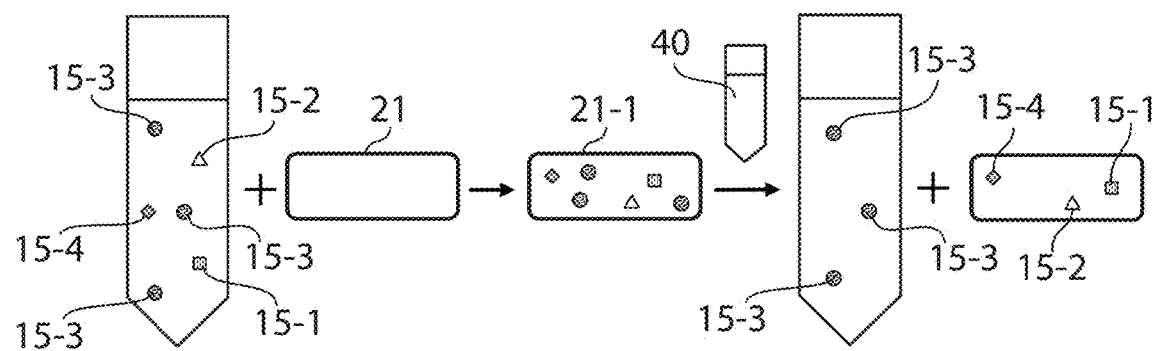

In some embodiments, the release of rare earths from the biomass may be sensitive to pH or ionic concentration, such that preferential or otherwise disproportionate release can be varied or controlled with pH or ionic concentration. For instance, after exposure to a solution 25, biomass 20-2 may be exposed to a solution having a different pH or ionic concentration, or in some cases, acid or additional ions may be added to the solution. As illustrated in FIG. 1C, biomass 20-2 may be exposed to solution 30, which has a different pH or ionic concentration than solution 25. Exposing biomass 20-2 to solution 30 may result in the preferential release of various rare earths into solution, e.g., such that at least one molar ratio of the rare earths in solution 30 is different than a molar ratio of a rare earth in solution 25. This is illustrated by the comparison of solutions 25 and 30 in FIG. 1B and FIG. 1C, respectively, after exposure to biomass. In some instances, the preferential release of rare earths due to solution 30 results in the enrichment of the solution in the rare earth 15-2 relative to the other rare earths (e.g., 15-1, 15-3, and 15-4) in solution. Thus, exposing biomass comprising rare earths to solutions having differences in pH or ionic concentration can be used to produce a plurality of solutions enriched in certain rare earths.

In some embodiments, a solution may undergo additional processing after becoming enriched in a rare earth. For instance, a solution enriched in a rare earth may be exposed to additional biomass to further enrich the solution in the rare earth (i.e., increase the molar ratio of the rare earth in solution). As illustratively shown in FIG. 1D, a solution 35 comprising rare earths 15-1, 15-2, 15-3, and 15-4 may be enriched in rare earth 15-3. The solution may be exposed to biomass 21, forming biomass 21-1 comprising rare earths 21-1. The biomass comprising rare earths may then be exposed to a solution 40, which causes rare earths 15-3 to be preferentially released in the solution. Thus, in some instances, solution 40 has a greater molar ratio of the rare earth 15-3 than solution 35. The process of further enriching a solution in a rare earth may also be repeated in some cases until the desired molar ratio of a rare earth is achieved or exceeded.

Figure 1E:
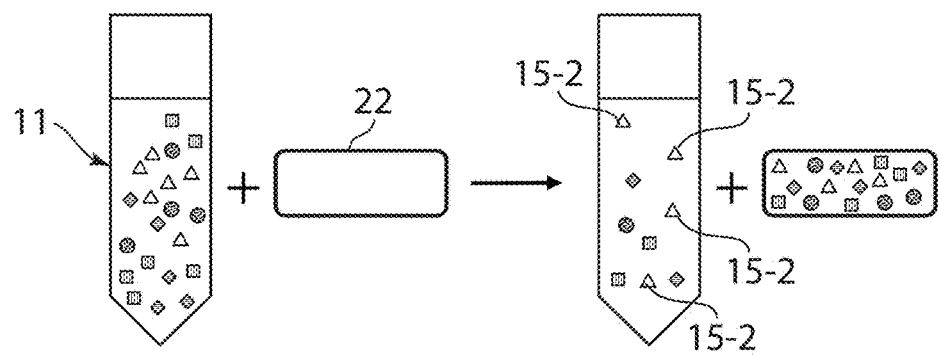

In some cases, as illustrated in FIG. 1E, transferring rare earths to biomass 22 (e.g., via adsorption) may cause a composition 11 to become enriched in a rare earth 15-2. In some instances, biomass may interact with a first rare earth differently than a second rare earth, such that the amount of the first rare earth transferred to the biomass is different than the amount of the second rare earth transferred to the biomass. This disproportionate transfer of a first rare earth relative to a second rare earth from the composition may accordingly allow for enrichment of the composition, e.g., in the first rare earth.

As mentioned, the initial composition comprising the rare earths to be at least partially separated and/or recovered may be, for example, a liquid or a solution, a sludge, a slurry, or the like, that contains one or more rare earths. For example, the composition may be a fluid (e.g., a solution, a liquid, a gas, etc.), a solid (e.g., bastnaesite, monazite, xenomite, or other minerals or ore, etc.), a mixture (e.g., an emulsion, a suspension, a sludge, a slurry, or the like), etc. The rare earths may be in any suitable form. For instance, the rare earths may be present as rare earth salts, rare earth ions, rare earth oxides, rare earth halides, rare earth hydrides, rare earth selenides, rare earth tellurides, rare earth nitrides, other rare earth binary compounds, other rare earth tertiary compounds, or combinations thereof. Thus, the rare earth may be present in any suitable form or structure, e.g., the rare earth may be present as atoms, ions, and molecules, etc. within the composition.

The initial composition may comprise any number of rare earths, e.g., selected from a group consisting of Sc, Y, La, Ce, Pr, Nd, Pm, Sm, Eu, Gd, Tb, Dy, Ho, Er, Tm, Yb, and Lu. In some cases, however, Ce is not substantially present, e.g., due to prior removal of the Ce via oxidation or other processes. For example, in one set of embodiments, Ce may be removed via oxidation or other processes prior to separation or enrichment of the composition as discussed herein. In addition, in some cases, other rare earths may have been removed as well, e.g., Pr, Tb, Sm, Eu, and/or Yb. For example, certain processes that exploit the tetravalent or divalent nature of these rare earths (e.g., oxidation) may be used. Thus, for instance, any of Ce, Pr, Tb, Sm, Eu, and/or Yb may be removed using these processes prior to separation or enrichment of the composition as discussed herein, in certain embodiments. In addition, the techniques described herein may be used to at least partially separate and/or recover any number of rare earths contained within a composition, for instance, at least two rare earths, at least three rare earths, at least 4 rare earths, at least 5 rare earths, at least 6 rare earths, at least 7 rare earths, at least 8 rare earths, at least 9 rare earths, at least 10 ten earths, at least 11 rare earths, at least 12 rare earths, at least 13 rare earths, or at least 14 earths, or all of the rare earths as described above.

Thus, certain aspects of the invention are generally directed to separation techniques where rare earths are transferred to or from biomass or other materials (for instance, liposomes and/or other materials exhibiting different binding pKa's to different rare earths), e.g., via adsorption and/or other processes. The amount transferred, in some cases, may be controlled by controlling the pH or other ion concentrations. The exact nature of the transfer of the rare earths to and from the biomass, liposomes, or other materials is not completely understood, but may involve processes such as physical adsorption and/or the formation of non-covalent bonds with components of the biomass, liposomes, or other materials (e.g., hydrogen-bonds, ionic bonds, dative bonds, Van der Waals interactions, electrostatic interactions, or the like). In one set of embodiments, for example, the biomass, liposomes, and/or other materials may exhibit different binding pKa's to different rare earths. In some embodiments, a rare earth may be associated with biomass via a biological binding event, e.g., rare earths may be taken up or internalized within the cells of the biomass, as discussed below.

In some embodiments, the effectiveness of the transfer to and/or release of rare earths from the biomass (or liposomes or other materials exhibiting different binding pKa's to different rare earths) can be determined by determining molar ratios, e.g., before and after exposure. Exposing a solution to biomass and/or liposomes comprising rare earths may cause the solution to show an increased molar ratio of a first rare earth, relative to the molar ratio of the first rare earth in the biomass and/or liposomes. In some cases, more than one rare earth will show such an increase in molar ratio. In some cases, processes such as those discussed herein can be used to produce solutions enriched in a first rare earth relative to a second rare earth (or in some cases, several rare earths relative to other rare earths). In addition, in some instances, a plurality of stages may be used to repeat this process to produce more enriched solutions containing rare earths.

As mentioned, the amount of transfer of the rare earth, in some cases, may be controlled by controlling the pH or other ion concentrations. Thus, for example, using biomass, liposomes, or other materials exhibiting different binding pKa's to different rare earths, changes in pH may differentially affect the binding of different rare earths to such materials. Such changes may be caused, for example, by separating the biomass (or liposomes or other materials) from a first solution and replacing the first solution with a second solution, and/or modifying the first solution in some manner (e.g., by adding acids, bases, additional solutions containing different ion concentrations, diluents, etc.). At different ion concentrations, different rare earths may be desorbed or otherwise released from the biomass and/or liposomes in different amounts or concentrations. The differences in transfer and/or release of rare earths to biomass and/or liposomes may be due to differences between the nature of the interaction of one rare earth and another rare earth with biomass and/or liposomes, and these may not necessarily be accurately known, as discussed above. In some cases, for instance, a rare earth can have a different association and dissociation constant than another rare earth under certain conditions, or ions such as hydrogen may compete (e.g., competitively) with the rare earths for binding or absorption sites within the biomass and/or liposomes. In some instances, one rare earth is associated with biomass and/or liposomes via different mechanism than another rare earth. In addition, as mentioned, these effects may be seen using liposomes or other materials exhibiting different binding pKa's to different rare earths, in accordance with other embodiments of the invention. For example, there may be differences in transfer and/or release of rare earths to liposomes, e.g., due to different binding pKa's of the liposomes to different rare earths.

Changes in ionic concentration may affect the transfer and/or release of rare earths from the biomass, liposomes or other materials exhibiting different binding pKa's to different rare earths. In some embodiments, for example, a first solution that the biomass and/or liposomes is exposed to may have a greater or lesser concentration of ions than a second solution that the biomass and/or liposomes is exposed to, and each of the solutions may cause differing amounts or concentrations of rare earths to be transferred to and/or released from the biomass and/or liposomes. Non-limiting examples of suitable ions include hydrogen, sodium, calcium, potassium, aluminum, barium, magnesium, iron, copper, nickel, cobalt, and ammonium. For instance, the biomass and/or liposomes may be exposed to a first solution containing a first concentration of hydrogen ions, sodium ions, etc., and a second solution containing a second concentration of hydrogen ions, sodium ions, etc.

For example, in some cases, changes in pH may be used to transfer and/or release rare earths from the biomass, liposomes, or other materials exhibiting different binding pKa's to different rare earths). For example, in embodiments in which the hydrogen ion concentration is controlled, the pH may be less than or equal to about 7, less than or equal to about 6.5, less than or equal to about 6, less than or equal to about 5.5, less than or equal to about 5, less than or equal to about 4.5, less than or equal to about 4, less than or equal to about 3.5, less than or equal to about 3, less than or equal to about 2.5, or less than or equal to about 2, etc. In some instances, the pH is from about 0 to about 8, about 1 to about 8, about 2 to about 8, about 3 to about 8, about 4 to about 8, about 5 to about 8, about 5.5 to about 8, about 6 to about 8, or about 6.5 to about 8. The pH may also be changed between various values, including any of these, as previously discussed. The pH may be changed, for instance, by replacing the solution with a solution having a different pH (e.g., one of the pHs discussed above), and/or by adding a suitable acid (or base) to the solution to alter its pH. Non-limiting examples of acids that may be used include HCl, $H_2SO_4$, $HNO_3$, or the like. Non-limiting examples of bases include NaOH, KOH, or the like.

Changes in other, non-hydrogen ions may also be used in some embodiments.

For example, in embodiments in which the ion is a non-hydrogen ion, the biomass, liposomes, or other materials exhibiting different binding pKa's to different rare earths, may be exposed to ion concentrations of greater than or equal to about $10^{-7}$ M, greater than or equal to about $10^{-6}$ M, greater than or equal to about $10^{-5}$ M, greater than or equal to about $10^{-4}$ M, greater than or equal to about $10^{-3}$ M, greater than or equal to about $10^{-2}$ M, greater than or equal to about $10^{-1}$ M, greater than or equal to about 1 M, or greater than or equal to about 10 M, etc. The ion concentration may also be changed between various values, including any of these. Such ion concentrations can be changed, for example, by replacing the solution with a solution having a different ion concentration, and/or by adding a concentrate or a diluent to the solution to alter the ion concentration. Examples of suitable ionic solutions include solutions of any of the ions described herein.

In some embodiments, after exposure to biomass (or liposomes or other materials exhibiting different binding pKa's to different rare earths), at least a portion of a solution or composition may be removed or separated from the biomass. In general, any suitable separation or removal method may be used. Non-limiting examples include centrifugation, filtration, dialysis, distillation, etc. In some cases, the solutions separated from the biomass (or liposomes or other materials) may be combined, although in other cases, some of the solutions may remain separated. At least some of the solutions may be enriched in one or more rare earths, as previously described.

The light rare earths are La, Ce, Pr, and Nd; the middle rare earths are Sm, Eu, Gd, Tb, and Dy); and the heavy rare earths are Ho, Er, Tm, Yb, and Lu. In one embodiment, biomass, liposomes, or other materials exhibiting different binding pKa's to different rare earths comprising light and heavy rare earths may be exposed to a change in pH or ionic concentration to produce a solution enriched in light rare earths. In another example, a composition comprising light, middle, and heavy rare earths may be exposed to biomass (or other liposomes or other materials) to produce a solution enriched in heavy rare earths. In some embodiments, rare earths whose atomic number differs by less than or equal to 3, 2, or 1 (i.e., neighboring rare earths) may be exposed to biomass and/or liposomes to produce a solution enriched in one of the rare earths. In one embodiment, a solution comprising neighboring rare earths (e.g., Tm and Lu) may be exposed to a biomass and/or liposomes to produce a solution enriched in one of the rare earths (e.g., Tm).

In general, any biomass may be utilized. In some embodiments, the biomass may comprise prokaryotes, bacteria such as Gram negative bacteria or Gram positive bacteria, eukaryotes, archaea, fungi, exopolysaccharide, lignin, or combinations thereof. Non-limiting examples of biomass include *Pseudoalteromonas* sp., *Alcanivorax* sp., *Acinetobacter* sp., *Roseobacter* sp., *Vibrio* sp., *Halomonas* sp., *Sphingomonas* sp., *Shewanella Oneidensis, Leptospirillum Ferrodiazotrophum*, lignin, or combinations thereof. In some instances, the biomass comprises a living cell. Certain types of cells (e.g., bacteria) can be quickly grown to produce biomass, e.g., as needed. The cells within the biomass may also be in any suitable growth phase (e.g., freshly inoculated, exponential, stationary, etc.). However, in some cases, biomass does not contain a living cell. For example, the biomass may contain only dead cells, and/or the biomass may contain extracted matter (e.g., exopolysaccharides, lignin, etc.).

In some embodiments, the preferential transfer and/or release of rare earths depends on the type of biomass. For example, a first biomass and a second biomass may not exhibit the same transfer and/or release characteristic under equivalent conditions. As one example, a first biomass may release a first rare earth at a certain ion concentration and a second biomass may release a second rare earth at the same ion concentration. In some embodiments, differences in the preferential transfer and/or release of rare earths based on different biomasses may be used to at least partially separate and/or recover rare earths.

Examples of liposomes that may used include, but are not limited to 18:1 PA, 1,2-dioleoyl-sn-glycero-3-phosphate; 18:1 DGS, 1,2-dioleoyl-sn-glycero-3-succinate; 18:1 PS (DOPS) 1,2-dioleoyl-sn-glycero-3-phospho-L-serine; DSPE-PEG(2000) Succinyl 1,2-distearoyl-sn-glycero-3-phosphoethanolamine-N-[succinyl(polyethylene glycol)-2000]; 10:0 PA 1,2-didecanoyl-sn-glycero-3-phosphate.

In some embodiments, the biomass, liposomes, or other materials exhibiting different binding pKa's to different rare earths is exposed to a composition (e.g., solution, suspension, mineral, ore, etc.) comprising rare earths for a certain amount of time. For instance, in some embodiments, biomass and/or liposomes is exposed to a composition comprising rare earths for less than about less than or equal to about 24 hours, less than or equal to about 18 hours, less than or equal to about 12 hours, less than or equal to about 6 hours, less than or equal to about 4 hours, less than or equal to about 3 hours, less than or equal to about 2 hours, less than or equal to about 1 hour, less than or equal to about 30 minutes, less than or equal to about 20 minutes, or less than or equal to about 10 minutes.

In some embodiments, the biomass, liposomes, or other materials exhibiting different binding pKa's to different rare earths, is exposed to a solution comprising ions for a certain amount of time. In some instances, the exposure of biomass and/or liposomes to solution comprising ions may be relatively short. For instance, in some embodiments, biomass and/or liposomes are exposed to a solution comprising ions for less than or equal to about 4 hours, less than or equal to about 3 hours, less than or equal to about 2 hours, less than or equal to about 1 hours, less than or equal to about 50 minutes, less than or equal to about 40 minutes, less than or equal to about 30 minutes, less than or equal to about 20 minutes, less than or equal to about 10 minutes, less than or equal to about 5 minutes, less than or equal to about 1 minute, less than or equal to about 30 seconds.

In some embodiments, the biomass, liposomes, or other materials exhibiting different binding pKa's to different rare earths is exposed to a composition or solution comprising rare earths at a certain temperature. For instance, in some embodiments, the temperature during exposure of biomass and/or liposomes to a composition comprising rare earths is greater than or equal to about 0° C., greater than or equal to about 5° C., greater than or equal to about 10° C., greater than or equal to about 20° C., greater than or equal to about 30° C., greater than or equal to about 37° C., greater than or equal to about 40° C., or greater than or equal to about 50° C. In some instances, the temperature during exposure of biomass and/or liposomes to a composition comprising rare earths is less than about 70° C., less than about 60° C., less than about 50° C., less than about 40° C., less than about 30° C., less than about 20° C., or less than about 10° C. Combinations of the above-referenced ranges are also possible (e.g., greater than or equal to about 20° C. and less than about 40° C.). Other values for temperature are also possible.

As mentioned, a composition comprising rare earths may undergo exposure to more than one solution to produce one or more solutions enriched in certain rare earths. This may be accomplished, for example, as a batch or semi-batch process, or in a continuous process in some embodiments, e.g., comprising a plurality of stages. In some embodiments, the plurality of stages may be housed within a column or other reactor, e.g., a flow reactor. For example, the reactor may contain stages arranged such that solutions comprising ions and compositions comprising rare earths enter the reactor at various stages as indicated by arrows 70 in the schematic diagram of FIG. 1F. Biomass and/or liposomes may be present within at least some of the stages. For example, the biomass and/or liposomes may comprise at least about 10%, at least about 20%, at least about 30%, at least about 40%, at least about 50%, at least about 60%, at least about 70%, at least about 80%, or at least about 90% of the volume of the reactor, or of at least one of the stages within the reactor. The reactor can also be configured in some embodiments such that solutions may exit at the end of the reactor, and/or at any point as illustrated by arrows 75.

For example, an initial solution comprising first and second rare earths may be passed through a plurality of stages in a reactor. In at least some of the stages, the rare earths are exposed to biomass and/or liposomes where the second rare earths have a greater affinity for biomass and/or liposomes than the first rare earths. An exiting solution having an increased molar ratio of first rare earth relative to the second rare earth, relative to the initial solution, may be recovered from the reactor. In some instances, at least a portion of the exiting solution is recycled back into the flow reactor (e.g., to further increase the molar ratio of first rare earth to second rare earth, to form a solution enriched in the second rare earth).

Figure 1F:
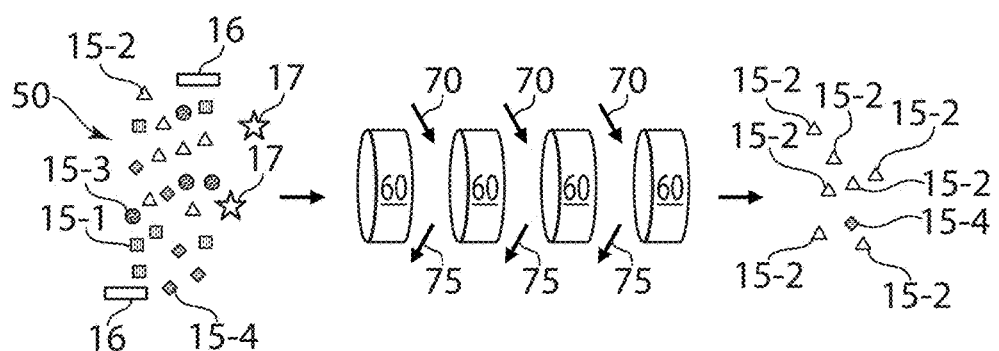

A non-limiting illustration of this is shown in FIG. 1F. In FIG. 1F, a composition comprising rare earths entering the reactor, at any stage in the reactor, may exit as one or more solutions enriched in certain rare earths. For instance, as shown in FIG. 1F, a composition 50 comprising rare earths 15-1, 15-2, 15-3, 15-4, uranium 16, and thorium 17 may enter the reactor through at the first stage. Some of the stages may have a greater affinity for a rare earth (e.g., 15-1, 15-3, 15-4) than rare earth 15-2, such that a solution exiting the reactor is enriched in the first rare earth. In some embodiments, at least a portion of a solution exiting the reactor at any stage may re-enter the column at any stage to be further processed, e.g., as in a recycle loop. In some embodiments, biomass and/or liposomes may also enter and exit the reactor, e.g., as a batch or a continuous process, depending on the embodiment.

In some embodiments, relatively high separation ratios may be achieved using such reactors. For example, the ratio of the molar ratio of a first rare earth to the molar ratio of second rare earth, after one or more stages or portion (or all) of a reactor as described above, as compared to the initial molar ratio, may be greater than or equal to about 1.5, greater than or equal to about 2, greater than or equal to about 2.5, greater than or equal to about 3, greater than or equal to about 4, greater than or equal to about 5, greater than or equal to about 6, greater than or equal to about 8, greater than or equal to about 10, greater than or equal to about 15, greater than or equal to about 20, greater than or equal to about 30, greater than or equal to about 50, greater than or equal to about 75, or greater than or equal to about 100, etc. In addition, in some embodiments, a rare earth may be separated from another rare earth using relatively few stages, where in each stage, the rare earth is exposed to a different biomass and/or liposomes, and/or a different ion concentration.

In some embodiments, a composition or solution comprising rare earths may undergo one or more pre-treatments before exposure to biomass, liposomes, or other materials exhibiting different binding pKa's to different rare earths. For instance, in some embodiments, a mineral comprising rare earths may be converted into a solution or a slurry comprising rare earth ions, e.g., by crushing the minerals, exposing them to acid, etc. In some instances, a composition comprising cerium amongst other rare earths may undergo an oxidation process to remove at least some of the cerium. In certain embodiments, a composition or solution comprising rare earths may be exposed to a chelator prior to exposure to biomass and/or liposomes, e.g., to alter the interaction of at least some of the rare earths with biomass and/or liposomes. Non-limiting examples of chelators include dipicolinic acid, citric acid, diethylene triamine pentaacetic acid, 1,2-cyclohexane diamine tetra acetic acid, ethylenediaminetetraacetic acid, and combinations thereof. In certain embodiments, a composition comprising rare earths may undergo a concentrating process to concentrate the rare earths in the composition. In general, a composition or solution comprising rare earths may undergo any suitable treatment known by those of ordinary skill in the art to aid in the separation of rare earths.

In some embodiments, processes such as those discussed herein may be used to separate rare earths from other metals, such as uranium and thorium. For instance, in some embodiments, a composition comprising rare earths, thorium, and uranium may be exposed to a biomass and/or liposomes, such that the rare earths are preferentially transferred to the biomass and/or liposomes, and the composition is enriched in thorium and uranium, e.g., in processes similar to those discussed above. In some cases, multiple stages or operations may be used. In some embodiments, a composition comprising rare earths, thorium, and uranium may be exposed to a biomass and/or liposomes, which is then exposed to changes in pH or ionic concentration, such that the rare earths are preferentially released but at least a portion of thorium and uranium is retained.

In addition, in some embodiments, cells may be grown within a solution comprising rare earths, and such cells may preferentially absorb certain rare earths to others. This can be used to enrich solutions in certain rare earths. For instance, in some embodiments, incubating cells in a solution comprising heavy rare earths (e.g., Ho, Er, Tm, Yb, Lu) and light rare earths (e.g., La, Ce, Pr, Nd) may result in disproportionate transfer or uptake of the light rare earths to the cells, such that the external solution becomes enriched in the heavy rare earths. After culturing the cells in the rare earth solution, at least a portion of the solution can be removed for recovery or further processing of the rare earths, which may thereby be enriched in some rare earths. The cells can also removed in some embodiments to recover the other rare earths. For example, the cells may be lysed and the lysate processed as discussed herein to recover enriched solutions containing the rare earths from the cells. The cells may be any suitable cells, including any of the ones discussed herein.

Figure 2:
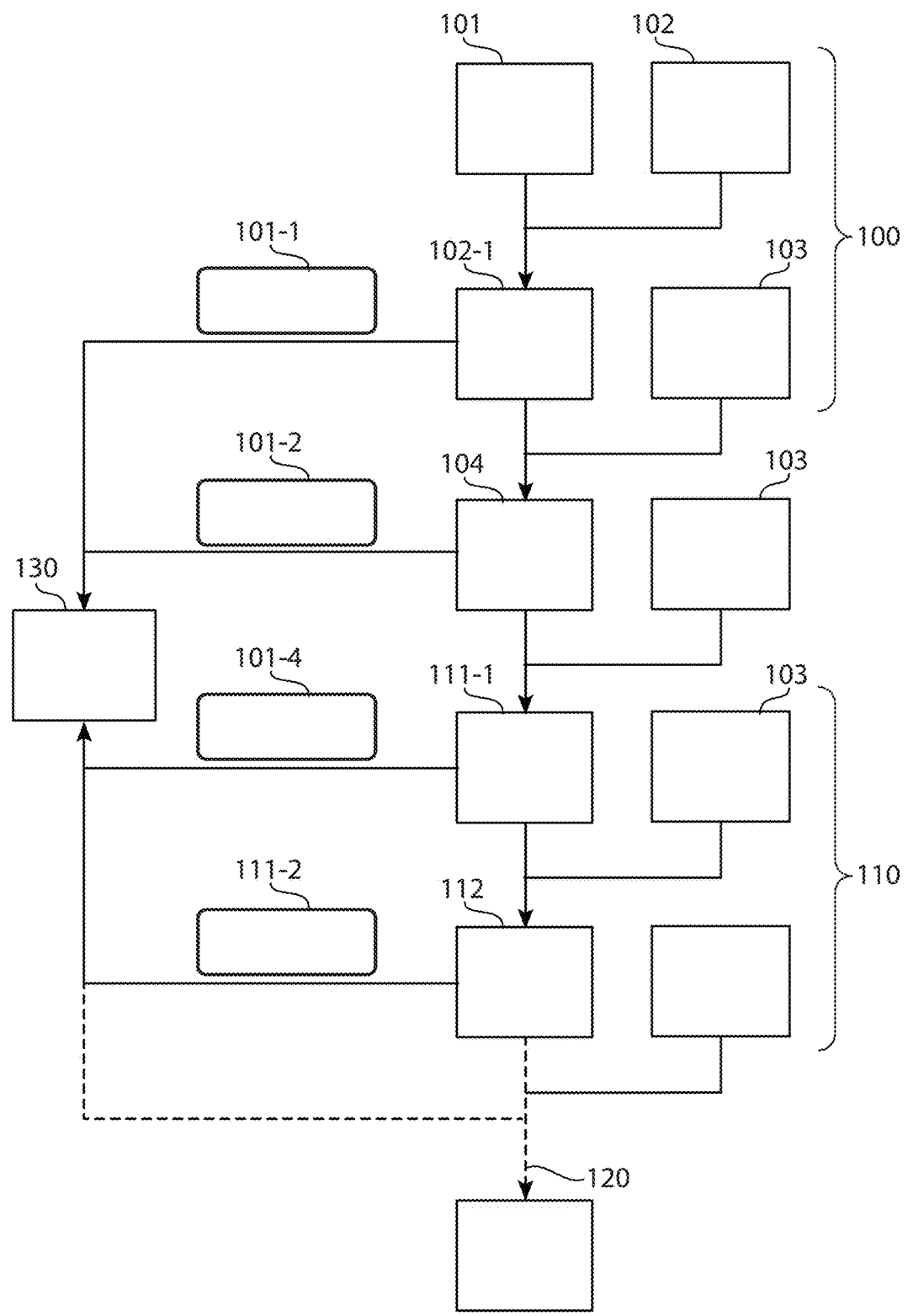
FIG. 2 illustrates a flow chart for the recovery of a rare earth, according to one set of embodiments.

A non-limiting example of using biomass to achieve a desired molar ratio of rare earth is shown in FIG. 2. As shown in FIG. 2, a process for achieving a desired molar ratio of a rare earth involves a plurality of cycles. A cycle comprises the transfer of rare earths to biomass and the release of rare earths from biomass. An individual step in a cycle (e.g., the transfer step or the release step) may be referred to as a stage. The first cycle 100 comprises exposing a composition comprising rare earths 101 to biomass 102 to form a biomass 102-1 comprising rare earths. In other embodiments, it should be understood that liposomes or other materials may be used instead of or in addition to biomass. The biomass 102-1 comprising rare earths is exposed to a solution 103, which has a certain ionic concentration, to form a solution 104 enriched in a rare earth. In the second cycle 110, the solution 104 may be exposed to biomass 111 form a biomass 111-1 comprising rare earths. Biomass 111-1 comprising rare earths can be exposed to solution 103 to form a solution 112 further enriched in a first rare earth. The further enrichment may be due to the preferential transfer of the first rare earth to biomass 111 or the preferential release of the first rare earth from biomass 111-1. One or more of these cycles can be repeated, as indicated by arrow 120 until the desired molar ratio of first rare earth is achieved. In some embodiments, as shown in FIG. 2, material from a stage in cycle that is not used for a subsequent stage in the enrichment process can be recovered, e.g., to recover the rare earths. As illustrated in FIG. 2, after exposure to solution 103, biomass comprising the remaining rare earths (e.g., 102-2, 111-2) can also utilized in other processes, e.g., as indicated by box 130.

U.S. Provisional Patent Application Ser. No. 61/790,071, filed Mar. 15, 2013, entitled "Systems and Methods for Separating and Recovering Rare Earths," by Bonificio, et al., is incorporated herein by reference in its entirety.

The following examples are intended to illustrate certain embodiments of the present invention, but do not exemplify the full scope of the invention.

EXAMPLE 1

In industry, the separation of rare earths is a challenging process that can require more than 750 stages and toxic chemicals. This example describes a simpler and environmentally sound process that utilizes bacteria to separate and recover rare earths (i.e., elements with an atomic number, Z, of 57-71 and optionally 21 and 39) in aqueous solution. Bacteria were used to biosorb rare earths and then subsequently washed with low pH solutions to desorb different amounts of rare earths. Rare earths were separated during repeated biosorption/wash cycles by controlling the pH to levels that released differing ratios of the rare earths based on their binding affinity. Rare earths separation was achieved from a mixed aqueous solution with separation factors greater than what was achieved in industry to date. The experiments with rare earths also showed that Th was taken up by the cells during incubation, separating it from the rare earths.

Rare earths are typically defined as the 15 lanthanides (Z=57-71) and optionally Sc, and Y. Rare earth separation was challenging because the rare earths are chemically similar. Thus, typical mineral purification methods that take advantage of differences in elemental size, density, reduction potential, oxidation potential, melting point, boiling point, etc., cannot be readily adapted to rare earth separation. Industrial method typically use a series of liquid-liquid extractions that first separate the rare earths into groups of 3 or 4, and then further separate them into individual elements. A measure of separation called the separation factor quantifies the degree of separation between rare earths. The separation factor is defined as the ratio of distribution factors (i.e., the ratio of a rare earth between the two phases) of two rare earths. Equations 1 and 2 show how the distribution factor and separation factor would be calculated for rare earths Pr and Nd. The further the separation factor is from unity the better the separation.

$$\text{Distribution factor: } D_{Pr} = \frac{[Pr] \text{ in solution}}{[Pr] \text{ on biomass}} \quad (1)$$

$$\text{Separation Factor: } \alpha\frac{Pr}{Nd} = \frac{D_{Pr}}{D_{Nd}} \quad (2)$$

In conventional methods, the separation of a rare earth from a mixture of rare earth chlorides in solution is complicated because of low separation factors.

This example describes the development of methods for the separation of rare earths from an aqueous solution of mixed rare earth chlorides that utilized differences in biosorption between individual rare earths. Bacterial surface sites that bound rare earths had varying acid dissociation constants, or different pH levels at which the bacterial surface sites protonated and desorbed a bound rare earth. Washing bacteria that had rare earths biosorbed with low pH solutions released pH dependent ratios of rare earths. It was found that rare earths bound to bacteria separate during desorption by washing with a low pH nitric acid solution. The amount of each rare earth desorbed was a function of the pH of the wash, and differed among the rare earths. To demonstrate, a solution containing equal concentrations of the rare earths was incubated with a grown batch of *Roseobacter* sp. to allow for biosorption. Then, the bacteria were separated from their medium and washed with progressively lower pH solutions. After, each pH wash solution was analyzed using ICP-MS (inductively coupled plasma mass spectrometry) to measure the rare earth content desorbed during the washes.

Figure 3:
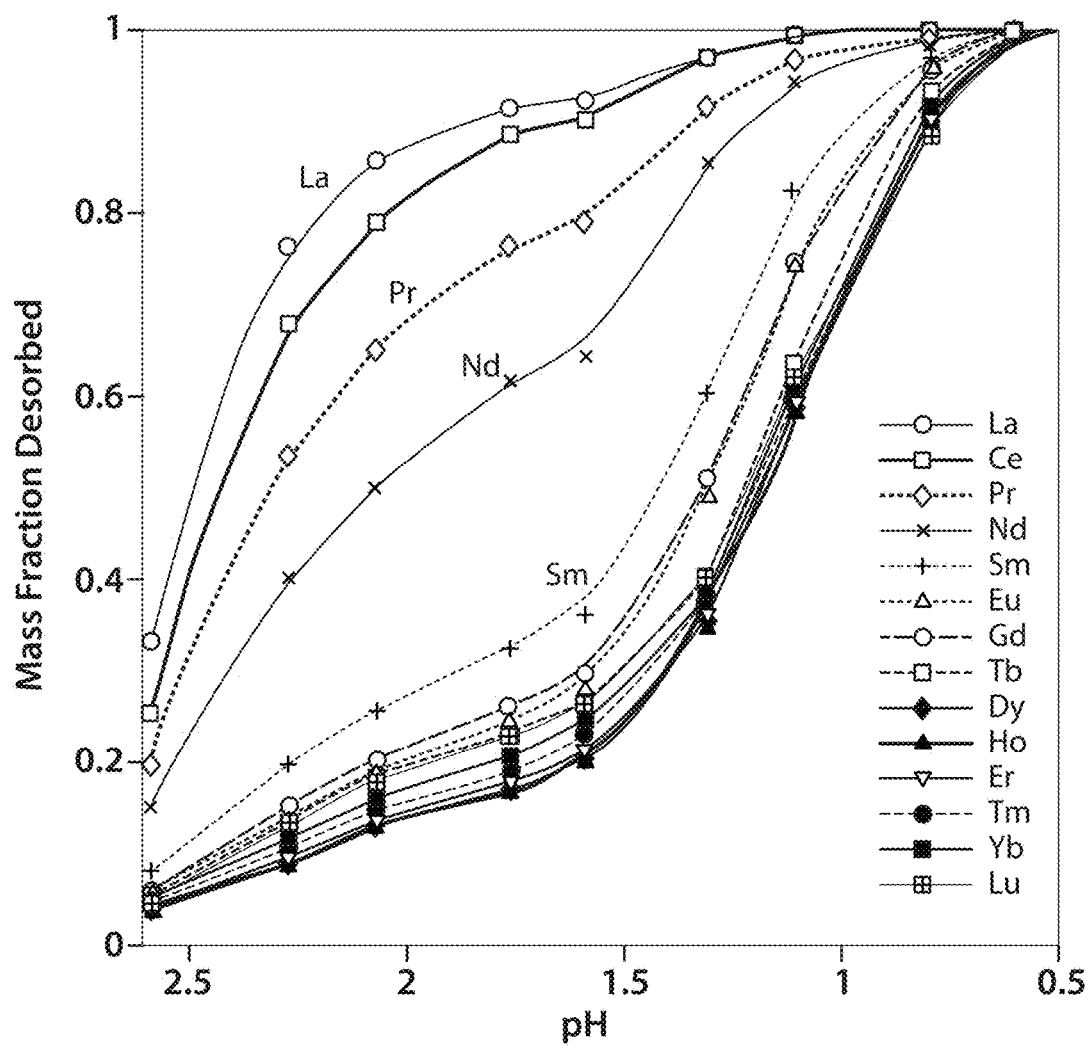
FIG. 3 illustrates a desorption plot for rare earths, according to certain embodiments.

FIG. 3 shows a desorption-plot of rare earths from *Roseobacter* sp. resulting from low pH washes. The vertical axis shows the cumulative mass of each rare earth desorbed divided by the initial biosorbed mass of the corresponding rare earth. The horizontal axis shows the pH of each wash solution. Differences in each rare earth curve were exploited to recover individual rare earths from a mixed aqueous solution by repeated biosorption/wash cycles at specific pH levels.

As shown in FIG. 3, there were pronounced differences in the desorption curves of the light rare earths (i.e., La, Ce, Pr, Nd, Z=57-60), desorbing at higher pH levels than the middle rare earths (i.e., Sm, Eu, Gd, Tb, Dy, Z=62-66) and heavy rare earths (i.e., Ho, Er, Tm, Yb, Lu, Z=67-71). In terms of separation, washing the bacteria with pH 1.31 nitric acid resulted in a separation factor for Pr/Nd of 1.41, which was greater than the typical industry separation factor of 1.17. This process of rare earth biosorption and washing with low pH solutions was developed into a full process for separating and recovering individual rare earths as described in Example 2.

EXAMPLE 2

Figure 4:
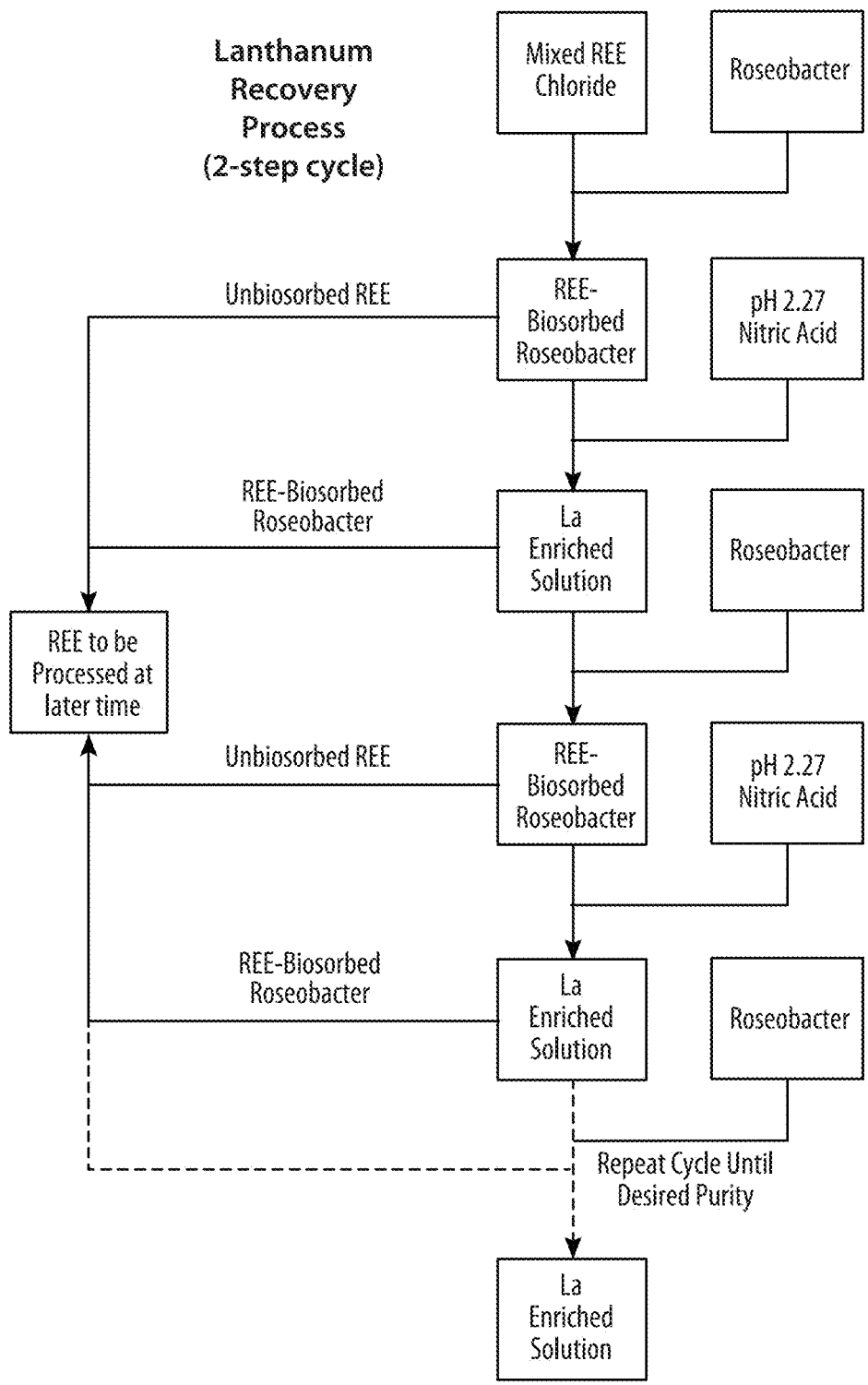
FIG. 4 illustrates a flow chart for the recovery of La, according to one set of embodiments.

This example describes as process for separating La from a solution containing mixed rare earth chlorides. Biosorbed La was desorbed more than any other element during a pH 2.27 nitric acid wash of the bacteria *Roseobacter* sp. Therefore, to achieve an enriched La solution from a mixture of rare earth chlorides in solution, two steps were needed in this example: 1) rare earths were biosorbed to *Roseobacter* sp. and 2) certain rare earths were desorbed using a pH 2.27 nitric acid wash. FIG. 4 is a flowchart of La recovery from a mixed rare earth chloride aqueous solution. The mixed rare earth solution was first combined with *Roseobacter* sp. to allow for biosorption. Then, the bacteria were washed with a pH 2.27 nitric acid solution. The wash became enriched in La. This wash was exposed to new *Roseobacter* sp. bacteria and the process was repeated, with each biosorption/wash cycle enriching the solution in La. The process of forming wash solutions with increasing enrichment in La was continued until the desired La purity was achieved. The unused material from each step (e.g., the solution separated from the biomass after bioabsorption) was collected to recover the other rare earths. An example step-by-step protocol to recover La using *Roseobacter* sp was as follows:

1) Provide a rich media batch of *Roseobacter* sp. with a mixture of rare earth chlorides in aqueous solution.

2) Shake/incubate for 1 hour so the rare earths biosorb onto the *Roseobacter* sp.

3) Pass the solution through a 0.2 micrometer filter, such that the bacteria are retained and unbound rare earths pass through. The unbound rare earths that passed were collected to be processed at a later time.

4) Withdraw a pH 2.27 nitric acid solution in the reverse direction through the filter, resuspending the bacteria in this solution.

5) Vortex the solution for 60 seconds, which desorbed select rare earths.

6) Pass the solution through a 0.2 micrometer filter, such that bacteria were retained and unbound rare earths pass through.

The protocol allowed separation to occur according to FIG. 3, with 76% of bound La desorbed and passed through the filter. The desorbed rare earth wash, now enriched in La, was recycled to step 1 to continue enrichment. The retained bacteria bound with rare earths were collected to reprocess at a later time.

Figure 5:
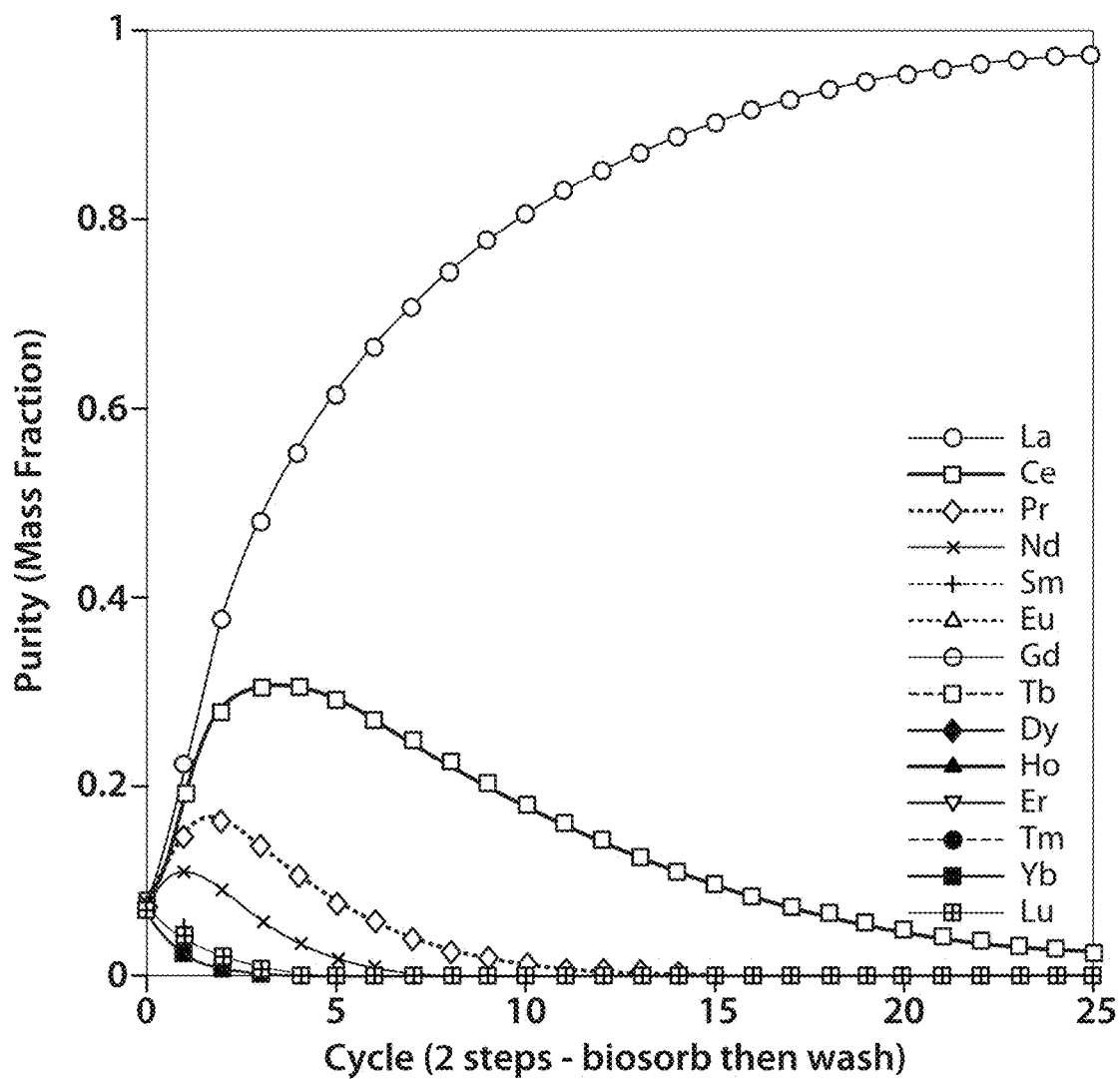
FIG. 5 illustrates a graph of rare earth purity versus number of steps, according to certain embodiments.

The La recovery after each step was modeled assuming that desorption was not strong function of rare earth concentration or competition. If the starting rare earth solution contained equal masses of each rare earth, FIG. 5 shows the increase in La purity after each step (i.e., biosorption and desorption) of recovery process that used *Roseobacter* sp. and a pH 2.27 nitric acid wash. The plot shows the purity of each element (vertical axis) after each step (horizontal axis) of the process. The purity was calculated as the mass of an individual rare earth divided by the total mass of rare earths. Step 0 was the initial solution that had equal concentrations of all rare earths in this example. Using this process, the initial solution was >95% pure La after only 20 cycles, and may be purer if substantial amounts of Ce were already removed, as can be done through other techniques.

EXAMPLE 3

Figure 6:
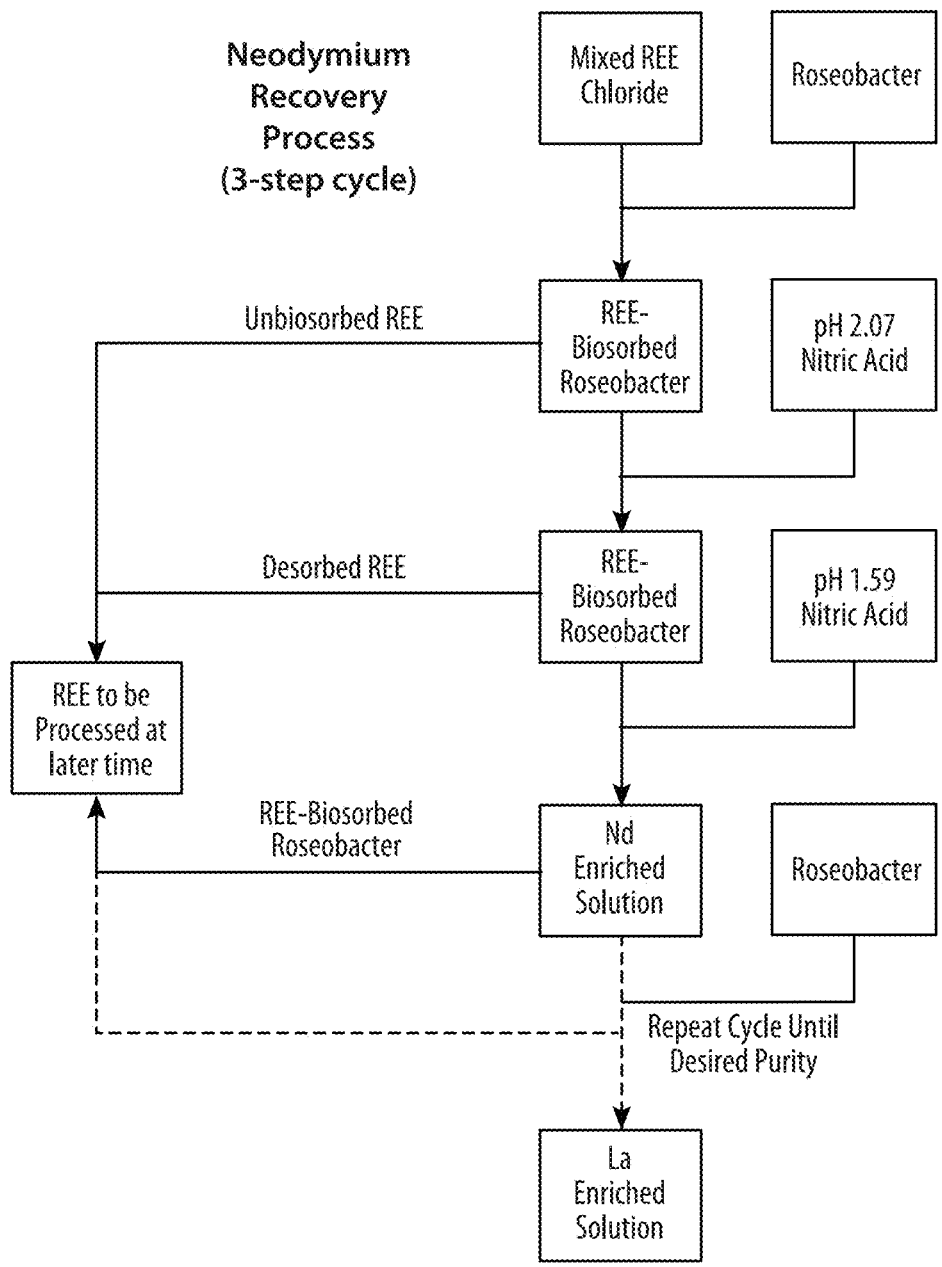
FIG. 6 illustrates a flow chart for the recovery of Nd, according to one set of embodiments.

This example describes as process for separating Nd from a solution containing mixed rare earth chlorides and an effluent stream from La recovery. Nd recovery from an aqueous solution containing mixed rare earth chlorides was similar to La recovery. Since Nd was typically not the most abundant rare earth desorbed at any given pH solution, a three step cycle with two pH washes was necessary. First, rare earths were biosorbed by *Roseobacter* sp. FIG. 6 shows a flow chart for the recovery of Nd from a mixture of rare earth chlorides in aqueous solution. First, the mixed rare earth solution was combined with *Roseobacter* sp. bacteria to allow for biosorption. Then, the bacteria were washed with a pH 2.07 nitric acid solution to remove unwanted rare earths. Next, the bacteria were washed with a pH 1.59 nitric acid solution; the solution becomes enriched in Nd as rare earths were desorbed from the bacteria. In this example, a cycle comprised a bisorption step and two wash steps, as opposed to biosorption and one wash step described in Example 2. This wash was exposed to new *Roseobacter* sp. and the process was repeated, each cycle enriching the solution in Nd. The unused material from each step was collected to recover the other rare earths. A step-by-step protocol to recover Nd using *Roseobacter* sp was as follows:

1) Provide a rich media batch of *Roseobacter* sp. with a mixture of rare earth chlorides in aqueous solution.

2) Shake/incubate for 1 hour, in order to biosorb the rare earths to the *Roseobacter* sp.

3) Pass the solution through a 0.2 micrometer filter, such that bacteria are retained and unbound rare earths pass through. The unbound rare earths that passed were collected to process at a later time.

4) Withdraw a pH 2.07 nitric acid solution in the reverse direction through filter, resuspending the bacteria in this solution.

5) Vortex the solution for 60 seconds desorbing select rare earths.

6) Pass the solution through a 0.2 micrometer filter, such that bacteria are retained and unbound rare earths pass through. In this step, the light rare earths desorbed and separated from the retained bacteria, which bound Nd and the heavier rare earths.

7) Withdraw a pH 1.59 nitric acid solution in the reverse direction through the filter, resuspending the bacteria in this solution.

8) Vortex the solution for 60 seconds desorbing select rare earths.

9) Pass the solution through a 0.2 micrometer filter, such that cells were retained and unbound rare earths pass through.

The protocol allowed separation to occur according to FIG. 3 as more Nd was desorbed and passed through the filter than any other rare earth that was present. The desorbed rare earth solution, now enriched in Nd, was recycled to step 1 to continue enrichment. The retained bacteria bound with rare earths were collected to reprocess at a later time.

Figure 7:
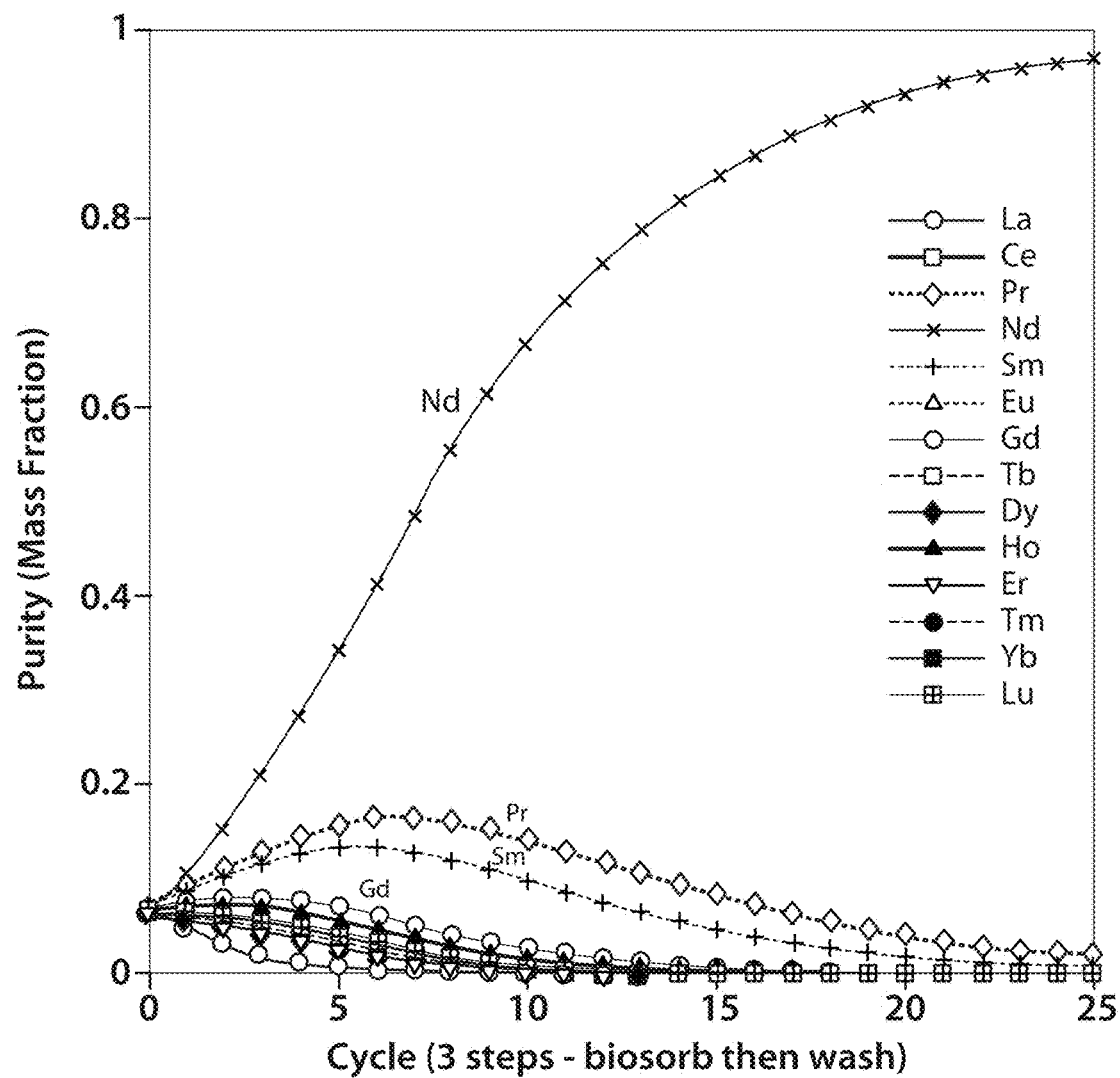
FIG. 7 illustrates a graph of rare earth purity versus number of steps, according to certain embodiments.

The Nd recovery described above was also modeled. A starting rare earth solution containing equal masses of each rare earth would be expected to become >95% pure Nd after 22 cycles, assuming desorption was not a strong function of concentration or competition. FIG. 7 shows the separation and enrichment of Nd from the other rare earths based on the recovery process that used *Roseobacter* sp. and pH 2.07 and pH 1.59 nitric acid washes. The plot showed the purity of each element (vertical axis) after each step (horizontal axis) of the process. The purity was calculated as the mass of an individual element divided by the total mass of rare earths. Step 0 was the initial solution that had equal masses of all rare earths. The solution was greater than 95% pure Nd after 22 steps.

Using only *Roseobacter* sp., similar processes, like the one described for Nd, can be used to recover at least some of the other rare earths.

Figure 8:
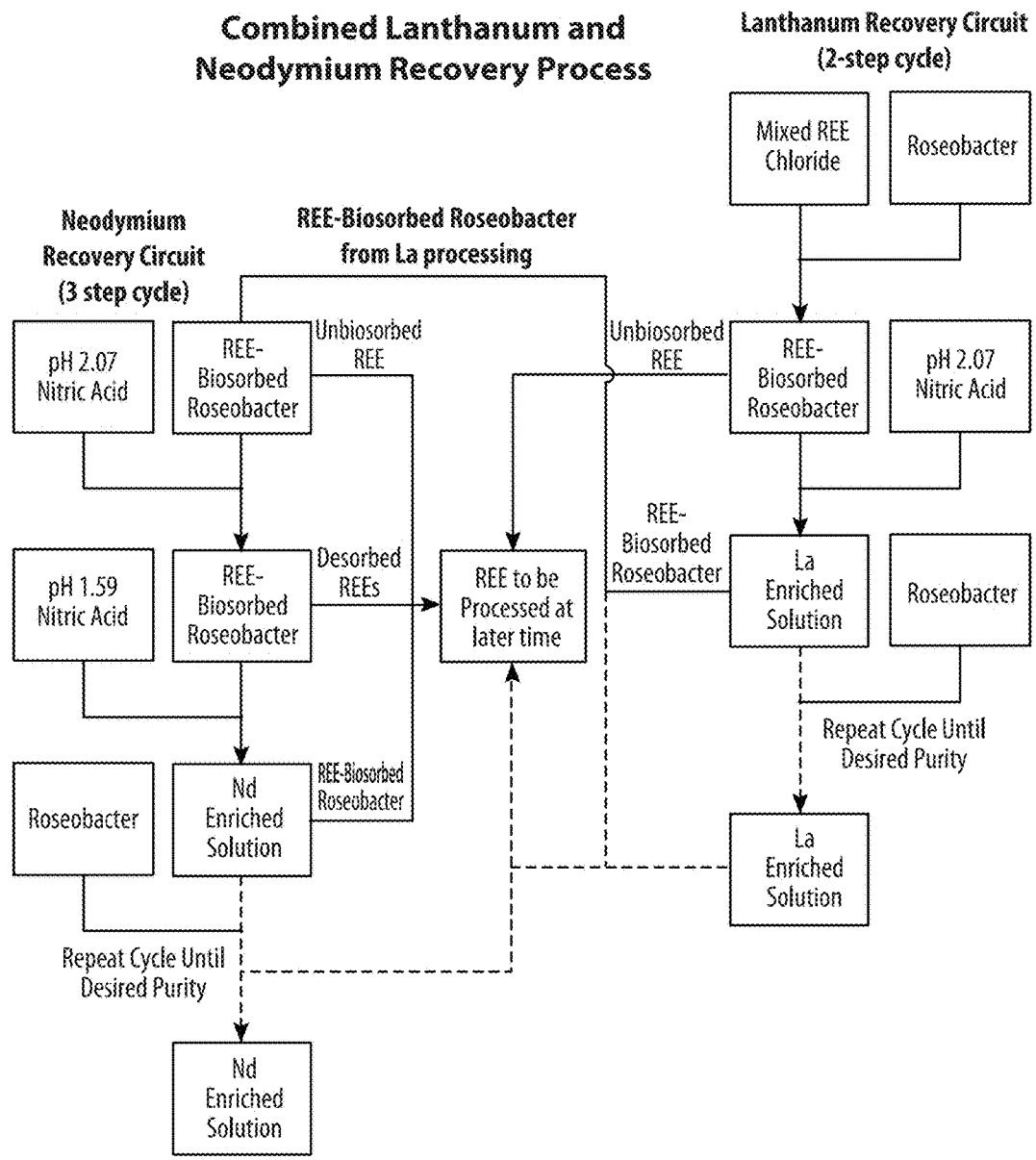
FIG. 8 illustrate a combined flow chart for the recovery of two rare earths, according to one set of embodiments.

The major effluent stream from the La processing could be used as the feedstock for Nd processing, as demonstrated by FIG. 8. FIG. 8 shows the combined La and Nd recovery from a single stream input of a mixture of rare earth chlorides in aqueous solution. The La recovery circuit is on the right, the Nd recovery circuit on the left, and unused rare earth material to be reprocessed is in the middle. The bacteria with biosorbed rare earths from the pH 2.27 nitric acid wash in the La recovery circuit was the feedstock for the Nd recovery circuit; these *Roseobacter* sp. with bound rare earths, now diminished in La, were washed with pH 2.07 nitric acid to begin the Nd recovery circuit. Combining these two recovery circuits eliminates an effluent stream from La recovery and increases the efficiency of Nd recovery because there was less La in the Nd feedstock. A similar strategy could be applied in other embodiments to recover other rare earths beyond the two demonstrated.

EXAMPLE 4

This example describes variations in the recovery process that were able to achieve separation of the rare earths, such as variations in the biomass, use of chelators, variation in the starting material, and variations in the method of isolating the biomass. In some instances, the variations improved separation.

Multiple variations in the recovery process were used that achieved separation and/or optimized the recovery processes. These included the use of communities of bacteria or various individual bacteria for biosorption, rather than only *Roseobacter* sp. Gram negative bacteria, and combinations of Gram negative bacteria were used in this example. Wet biomass was also used. Biomass in different growth phases (e.g., freshly inoculated, exponential phase, stationary growth, etc.) were also used.

Figure 9A:
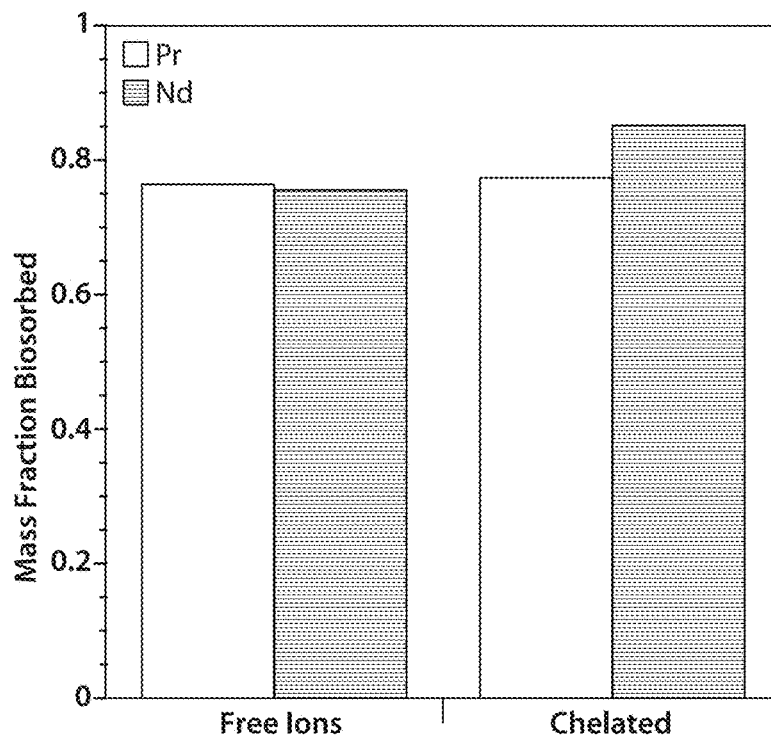
FIG. 9A-B illustrates (A) the mass fraction of rare earths biosorbed in the presence and absence of a chelator and (B) the desorption of rare earths at certain pHs in the presence of absence of a chelator, according to certain embodiments.
Figure 9B:
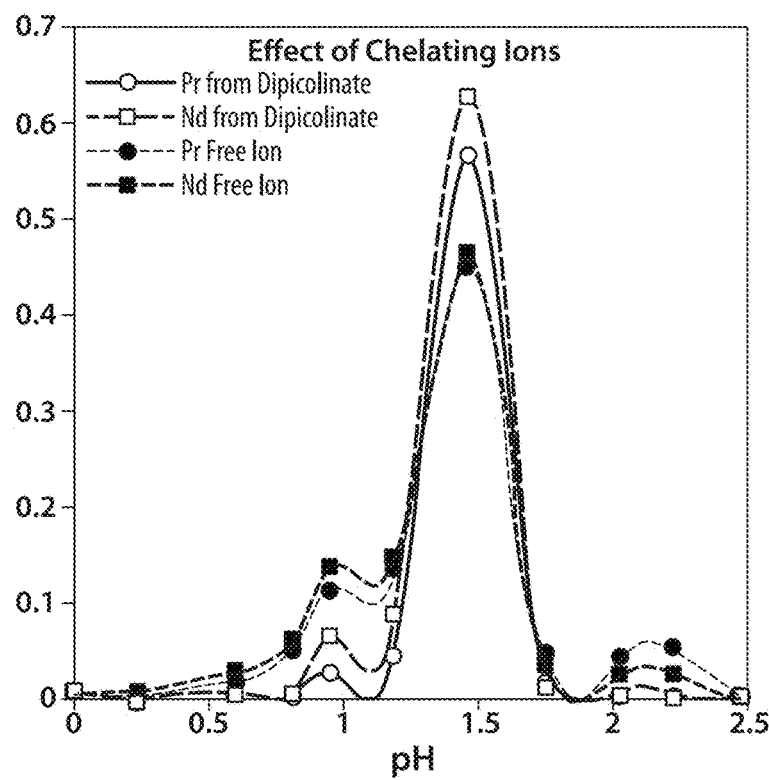

Chelating the rare earths prior to biosorption was found to enhance separation. Chelating Nd and Pr with dipicolinic acid and Ethylenediaminetetraacetic acid (EDTA) before biosorption improved their separation compared to controls not using the ligands. The improvement in Nd and Pr biosorption and desorption using dipicolinic acid is shown in FIGS. 9A and 9B, respectively.

Other mixture of rare earths, or solution of rare earth ions were used in other experiments, such as bastnaesite concentrate, with similar results.

Other conditions for biosorption were also explored such as the combination of the rare earths with the biomass material in a liquid medium (close to neutral pH), to allow for biosorption. Examples of liquid media used include water and cell growth media. Important factors that affected biosorption were the extent of mixing, time allowed for biosorption, temperature during biosorption, pH, etc.

Different methods for isolating the biosorbed biomass from medium were also used. The biosorbed rare earths on the biomass were isolated from the non-biosorbed rare earths in the media. This was accomplished through various techniques in different experiments, such as centrifugation and filtration.

EXAMPLE 5

This example describes experiments used to determine methods for the separation and recovery of rare earths using biomass. Nine different bacteria Gram negative bacteria were explored. The separation of rare earths using Gram negative bacteria was determined under several conditions in this example.

Multiple experiments to demonstrate the efficacy of biomass in rare earth separation and recovery were performed. In each experiment 9 different Gram-negative strains of bacteria, shown in Table 1, were tested. Data from *Shewanella Oneidensis* then *Roseobacter* sp., which were representative of each strain, is reported herein.

TABLE 1

Bacteria used in biosorption studies along with reason for selection

| Bacterial Strain | Reason for selection |
| --- | --- |
| *Pseudoalteromonas* sp. | Hydrothermal vent bacteria with high levels of polysaccharides |
| *Alcanivorax* sp. | Hydrothermal vent oil-degrading bacteria |
| *Acinetobacter* sp. | Hydrothermal bacteria with metabolic diversity |
| *Roseobacter* sp. | Marine bacteria that produces superoxide on cell surface |
| *Vibrio* sp. | Marine bacteria known to form colonies with Pseudoalteromonas |
| *Halomonas* sp. | Extremely halophilic marine bacteria |
| *Sphingomonas* sp. | Marine bacteria that lacks lipopolysaccharides on membrane |
| *Shewanella Oneidensis* | Bacteria capable of reducing many metals |
| *Leptospirillum Ferrodiazotrophum* | Bacteria capable of oxidizing iron |

First, the biosorption behavior of the bacteria was analyzed. In one sample, *Shewanella Oneidensis* was inoculated with 5 mL of 100 ppb rare earth chloride amended artificial seawater (ASW, pH: 6.5) nutrient rich media. In another sample *S. Oneidensis* was inoculated with 5 mL of rare earth-free ASW. The bacteria in each sample were shaken and incubated at 37° C. for 10 days until the bacteria grew to stationary phase. Then, rare earth free media was modified with 100 ppb of the rare earth chlorides; both samples were shaken and incubated for an additional 24 hrs. Next, both samples were centrifuged at 8000 rpm for 60 minutes to form a pellet, which was isolated from the media. The media was removed from these pellets and analyzed by inductively coupled plasma-mass spectrometry (ICP-MS).

The mass of a rare earth biosorbed by the bacteria was the mass of that rare earth initially added to the media minus the mass in the media after biosorption:

Mass Biosorbed: $m_{biosorbed} = m_{initial} - m_{media\ after\ biosorption}$

Figure 10:
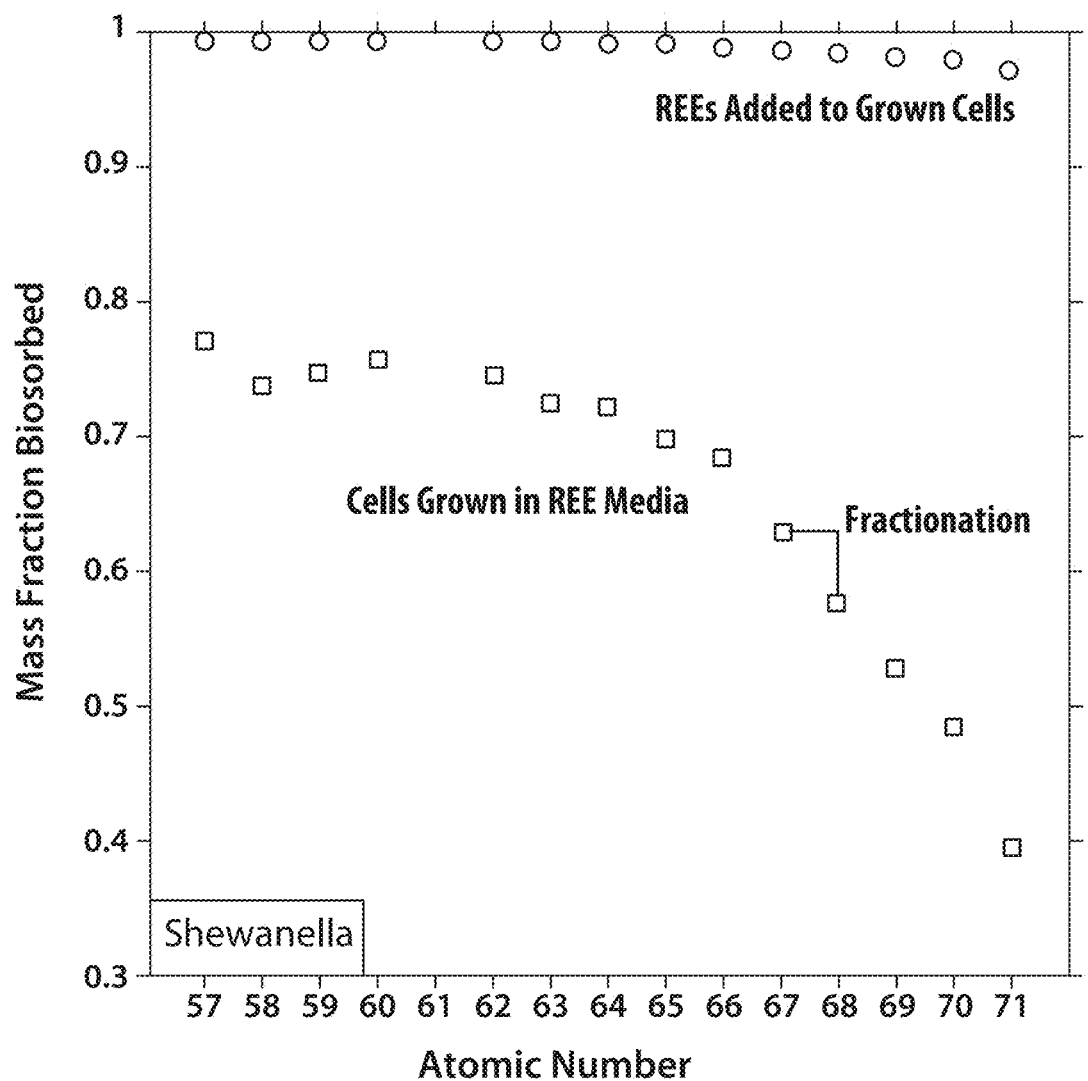
FIG. 10 illustrates biosorption of rare earths in the presence of cells in different growth phases, according to one set of embodiments.

FIG. 10 is a plot of the rare earth biosorption of *S. Oneidensis* grown in the presence of rare earths, and with rare earths added after growth. The plot shows the rare earth mass that was biosorbed by the bacteria divided by the total rare earth mass amended to the media in which the bacteria grew (vertical axis) for each rare earth (horizontal axis). Bacteria that were introduced to rare earths after reaching stationary phase of growth completely biosorbed all the rare earth added. Bacteria that grew in the presence of rare earths biosorbed less overall rare earths and fractionated the heavy rare earths. A rare earth separation method could exploit this fractionation. This trend observed for *S. Oneidensis* was consistent with the other strains tested.

Figure 11:
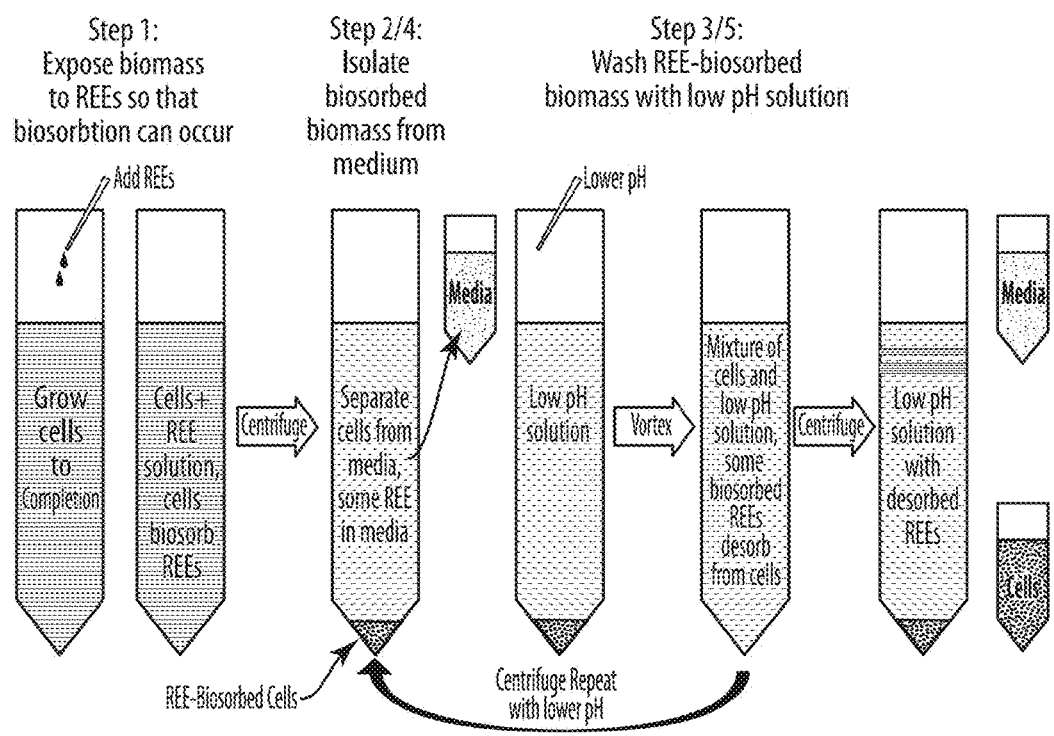
FIG. 11 illustrates a rare earth separation assay including biosorption and desorption, according to certain embodiments.

Subsequently, different rare earth binding sites on the bacteria were identified by titrating the rare earth biosorbed bacteria with progressively lower pH solutions. *Roseobacter* sp. was grown for 10 days in 5 mL of artificial seawater (ASW, pH: 6.5) nutrient rich media. During growth, the *Roseobacter* sp. was shaken and incubated at 37° C. After 10 days, the batch was amended with 100 ppb of each RE chloride. The batch was shaken and incubated with rare earths for an additional 24 hours. Then, the bacteria and media were centrifuged for 60 minutes at 8000 rpm to separate the media from the bacteria. The supernatant was pipetted from the pellet and saved for ICP-MS analysis. Next, a solution of pH 2.6 nitric acid was added to the pellet and the sample was vortexed at 3000 rpm for 60 seconds to resuspend the bacteria. After resuspension, the sample was centrifuged for 60 minutes at 8000 rpm to form a new pellet and the pH 2.6 nitric acid supernatant was pipetted from the pellet for ICP-MS analysis. Next, the pellet was combined with pH 2.25 nitric acid; the process was repeated with 12 different pH solutions between pH 2.6-0.05. At this point, each pH solution, now with desorbed rare earths, was analyzed for its rare earth content using ICP-MS. The schematic in FIG. 11 illustrates this rare earth biosorption/desorption separation assay. The step-by-step protocol for the assay was as follows:

1) Combine a solution of mixed rare earths with fully grown bacteria. Shake and incubate together so the rare earths biosorb to the bacterial cell walls.

2) Centrifuge this mixture to separate the bacteria that bound rare earths from the medium. Remove the medium from the rare earth-bound pellet and analyze for rare earth content.

3) Wash the rare earth-bound pellet with a low pH solution to desorb certain rare earths. Vortex the pellet in this low pH solution to resuspend the pellet, and fully desorb certain rare earths.

4) Centrifuge the partially desorbed bacteria in low pH solution to separate the rare earth-bound bacteria from the solution; analyze that solution for rare earths that desorbed during the wash.

5) Combine the rare earth-bound pellet with a lower pH solution to desorb more rare earths; vortex the bacteria again to suspend them, and to desorb certain rare earths.

6) Repeat this process, beginning at step 2, until all rare earths were fully desorbed from the bacteria. Finally, analyze each wash for rare earth content with ICP-MS.

A second assay using filtration, rather than centrifugation, was also performed for separation. In this assay *Pseudoalteromonas* sp. was grown in ASW for 10 days. Then, 1 mL of the batch was placed in a syringe. The batch was passed through a syringe filter (25 mm, 0.2 micrometers, polyethylsulfone (PES)) to coat the filter with the cells. Afterwards, a 100 ppb rare earth chloride aqueous solution was drawn up through the filter; the bacteria were resuspended with the rare earths in this solution. The rare earths were biosorbed to the bacteria by vortexing the solution within the syringe for 60 seconds at 3000 rpm. Then, the rare earth solution was passed through the filter so that the bacteria were retained, and the rare earth solution was saved for ICP-MS analysis. Next, 1 mL of water was withdrawn through the filter to resuspend the bacteria. Again, the syringe was vortexed and the solution was passed back through the filter, retaining the bacteria. This solution, which containing some desorbed rare earths, was saved for ICP-MS analysis. This process was repeated for 12 decreasing pH level, nitric acid solutions, and each solution was saved for ICPMS analysis. This process was faster than the centrifugation method previously described, and could be designed into a continuous flow system.

Figure 12:
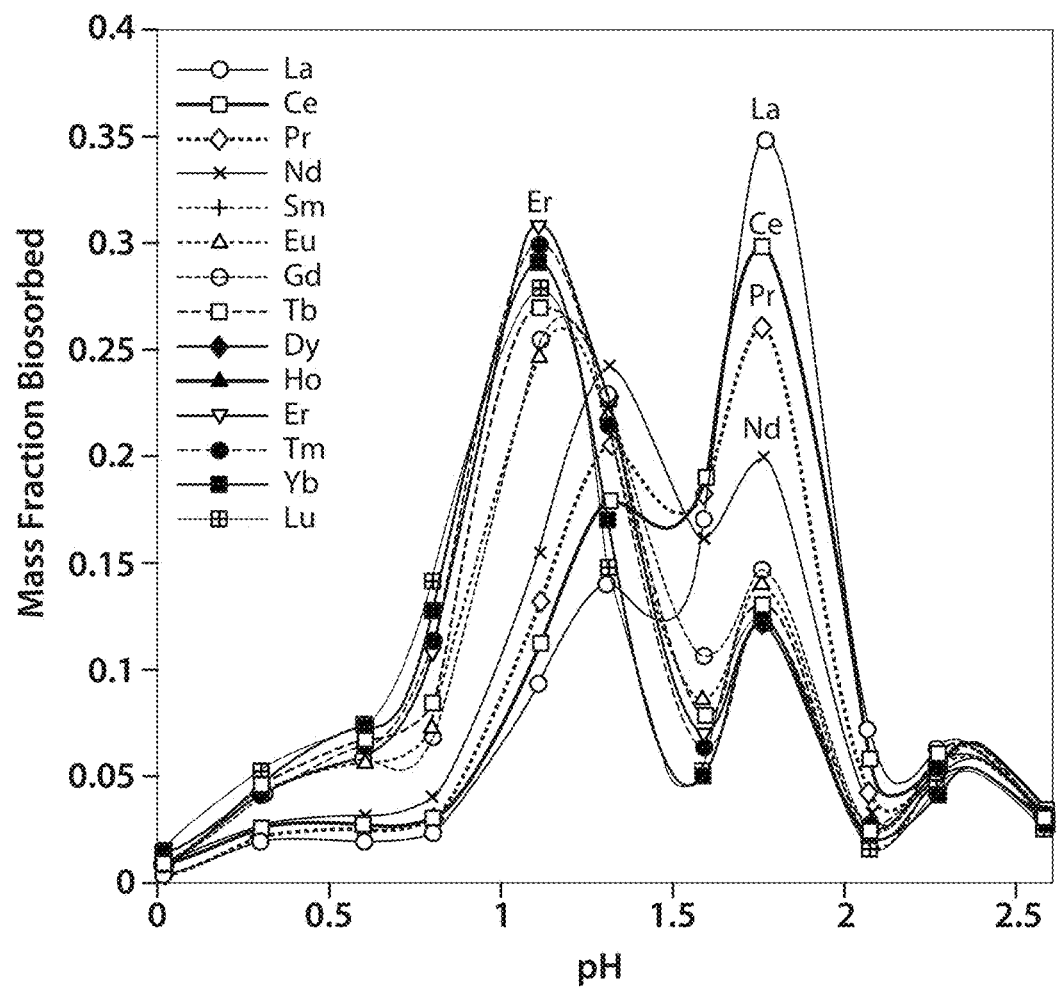
FIG. 12 illustrates a titration curve for rare earths, according to one set of embodiments.

FIG. 12 is a titration curve for each rare earth bound to *Roseobacter* sp. The plot shows the mass of each rare earth desorbed during a particular pH wash normalized by the total mass of that rare earth that was initially biosorbed. In other words, a pH 2.58 nitric acid wash desorbed 2% of all biosorbed La (Z=57), and a pH 1.75 nitric acid wash desorbed 35% of all biosorbed La. The data points were connected with a cubic spline fit to easily identify the rare earth desorption peaks. The peaks represent an array of bacterial surface binding sites with varying acid dissociation constants that become protonated at different pH levels. The light rare earths bind to sites with higher pH dissociation constants; the heavy rare earths bind to sites with lower pH dissociation constants. As the atomic number increases from light rare earths to heavy rare earths there was a decrease in the high pH peak on the right, and a concurrent increase in the low pH peak to the left. A rare earth separation method was developed to exploit this variation in rare earth binding.

Figure 13:
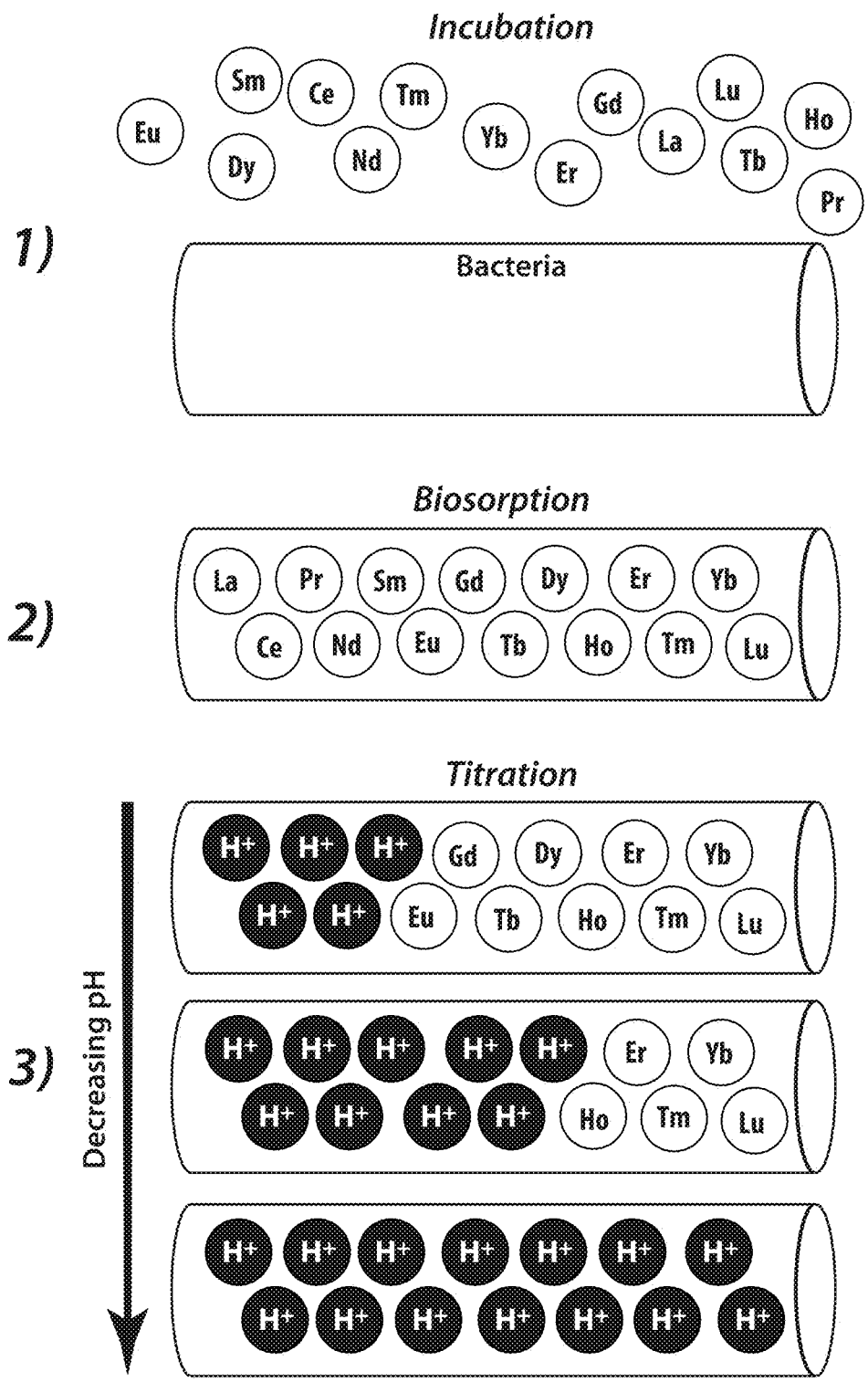
FIG. 13 illustrates biosorption on biomass and desorption from biomass, according to certain embodiments.

Bacterial surface sites bound protons and desorbed rare earths depending on pH. The acid dissociation constant (pKa) of a binding site was the pH level of its protonation. The *Roseobacter* sp. titration curves separated the rare earths based on binding sites, especially the light rare earths. Each of the bacteria that was tested had a unique titration curves with a general trend for light rare earths to be bound to higher pKa sites, and heavy rare earths to lower pKa sites. FIG. 13 shows a schematic of the biosorption/desorption model. First, the rare earths were incubated with the bacteria in solution, and biosorbed to it. Then, the bacteria were washed with a low pH solution; the light rare earths were removed as the sites that they were bound to become protonated. As the bacteria was washed with progressively lower pH solutions the middle rare earths, and finally the heavy rare earths, were released as the sites they were bound to become protonated.

The separation method utilizing bacteria had higher separation factors than the industrial liquid-liquid separation for the lightest and heaviest rare earths. Table 2 lists the separation factor for each rare earth neighbor based on the technique used to separate them. The industrial liquid-liquid extraction using two liquids, HCl and 2-ethylhexyl hydrogen 2-ethylhexylphosphophate (EHEHPA), is listed in the first data column, followed by the biosorption and desorption assay for *Vibrio* sp. and *Roseobacter* sp. are shown in columns 2 and 3, respectively.

TABLE 2

Comparison of separation factors for rare earth neighbors between the experiments described above, and a liquid-liquid extraction used industrially.

| rare earth pair | RE(III)-HCl-EHEHPA4 | *Vibrio* Grown With Rare earths | *Roseobacter* Titrated |
|---|---|---|---|
| La/Ce | 1.30 | 1.05 | 1.47 |
| Ce/Pr | 1.09 | 1.30 | 1.31 |
| Pr/Nd | 1.17 | 1.11 | 1.54 |
| Nd/Sm | 2.00 | 1.29 | 1.48 |
| Sm/Eu | 1.96 | 1.23 | 1.09 |
| Eu/Gd | 1.46 | 1.14 | 1.08 |
| Gd/Tb | 2.35 | 1.36 | 1.20 |
| Tb/Dy | 1.62 | 1.31 | 1.00 |
| Dy/Ho | 2.58 | 1.76 | 1.00 |
| Ho/Er | 1.25 | 1.57 | 1.01 |
| Er/Tm | 1.33 | 1.50 | 1.12 |
| Tm/Yb | 1.12 | 1.53 | 1.25 |
| Yb/Lu | 1.13 | 1.77 | 1.11 |

EXAMPLE 6

A filtration assay was developed that allows for the exposure of biosorbed lanthanides to various pH washes. See FIG. 14. The assay included first passing an adsorbant, in this case biomass or liposomes, across a hydrophilic filter (Pall, 0.2 micrometer GHP Acrodisc), so that the adsorbant is retained by the filter. Then, the 2 microgram/mL solution of mixed lanthanides passes across that filter, during which time some lanthanides adsorb to the adsorbant. Subsequently, a series of nitric acid solutions, each one lower in pH than the one before, passes the filter. These nitric acid solutions desorb the adsorbed lanthanides depending on the pH of the wash. Each of these nitric acid washes is then analyzed by ICPMS to quantify the amount of individual lanthanides desorbed as a function of pH. A syringe pump pumping at 2.5 mL/min for biomass and 1.25 mL/min for liposomes is used for the filtration. The order washes past the filter, the specific volumes for each wash, and the pH's of the nitric acid solutions are listed below.

Figure 14:
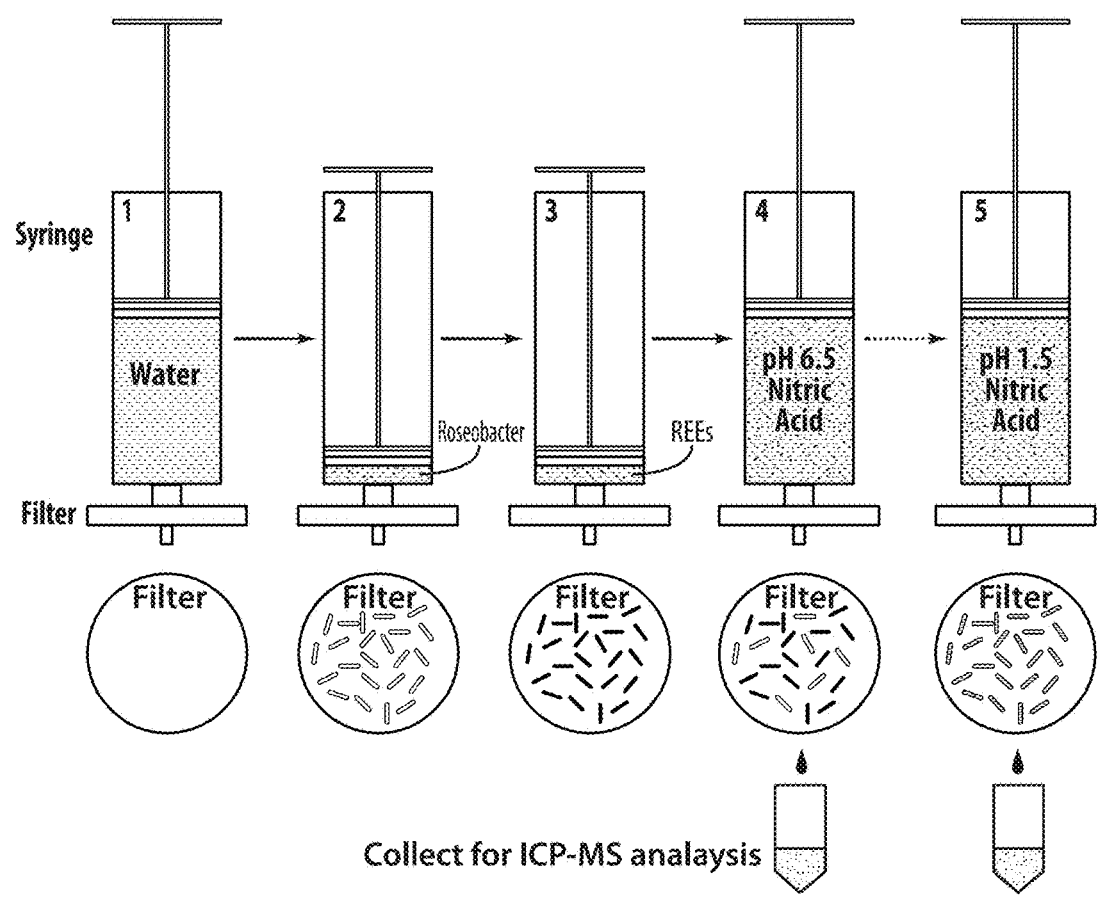
FIG. 14 illustrates lanthanide separation by filtration, according to one embodiment of the invention.

FIG. 14 shows a schematic of lanthanide separation by filtration. Cells were coated on a syringe filter and then biosorb the lanthanides. After, the cells were washed with nitric acid of sequentially lower pH levels. Each pH wash desorbed the REEs differently, leading to separation. 1) A syringe filter is saturated with water. 2) That same filter is coated with *Roseobacter* cells. 3) An REE solution is passed through the filter, and the cells biosorb the REEs. 4) A pH 6.5 nitric acid solution is passed through the filter desorbing some of the REEs. Nitric acid solutions with sequentially lower pH's are passed through the filter. 5) A pH 1.5 nitric acid solution is passed through the filter, completely desorbing any remaining REE from the cells.

TABLE 3

Sequence of washes past filter for titration assay.

| Step | Wash | Volume (mL) |
|---|---|---|
| 1 | Water | 5 |
| 2 | Adsorbant | 2 |
| 3 | Lanthanide solution | 1 |
| 4 | Water | 5 |
| 5 | Nitric acid pH 6.0 | 5 |
| 6 | Nitric acid pH 5.5 | 5 |
| 7 | Nitric acid pH 5.0 | 5 |
| 8 | Nitric acid pH 4.5 | 5 |
| 9 | Nitric acid pH 4.0 | 5 |
| 10 | Nitric acid pH 3.5 | 5 |
| 11 | Nitric acid pH 3.0 | 5 |
| 12 | Nitric acid pH 2.5 | 5 |
| 13 | Nitric acid pH 2.0 | 5 |
| 14 | Nitric acid pH 1.5 | 5 |

EXAMPLE 7

The filtration assay described in the previous example was adapted in this example to include a pre-protonation step for enhanced heavy lanthanide recovery. In this version of the filtration assay, after the filters have been coated with the adsorbant, a solution of nitric acid of pH 2.5 is pumped past the filter. Then, the lanthanide solution and subsequent nitric acid washes are passed through the filter as discussed above. The pre-protonation step allows hydrogen ions to bind and occupy all bacterial surface sites that have a pKa that is higher than that of the pre-protonation wash (pH 2.5 in this case). Those surface sites with a pKa lower than the wash remain available and unoccupied. These available sites preferentially bind the heavy lanthanides, so when a mixed lanthanide solution is passed through the filter, the heavy lanthanides are biosorbed and retained by the cells whereas the light lanthanides pass through. The biosorbed heavy lanthanides are then released when the cells are washed with an even lower pH (pH 1.5). (FIG. 15) This low pH wash enriched with heavy lanthanides can be neutralized and passed by new pre-protonated cells to enhance recovery. Alternatively, instead of passing the enriched heavy lanthanide solution by new pre-protonated cells, the original, fully protonated cells, can be recycled. In order to use these original cells they must first be desorbed of their protons by ion exchange (e.g. pass a solution of sodium hydroxide across the cells). The cells can then be used as they were before (e.g., 'pre-protonated' with pH 2.5 nitric acid, then washed with lanthanides, and washed once more with an even lower pH solution).

Figure 15A:
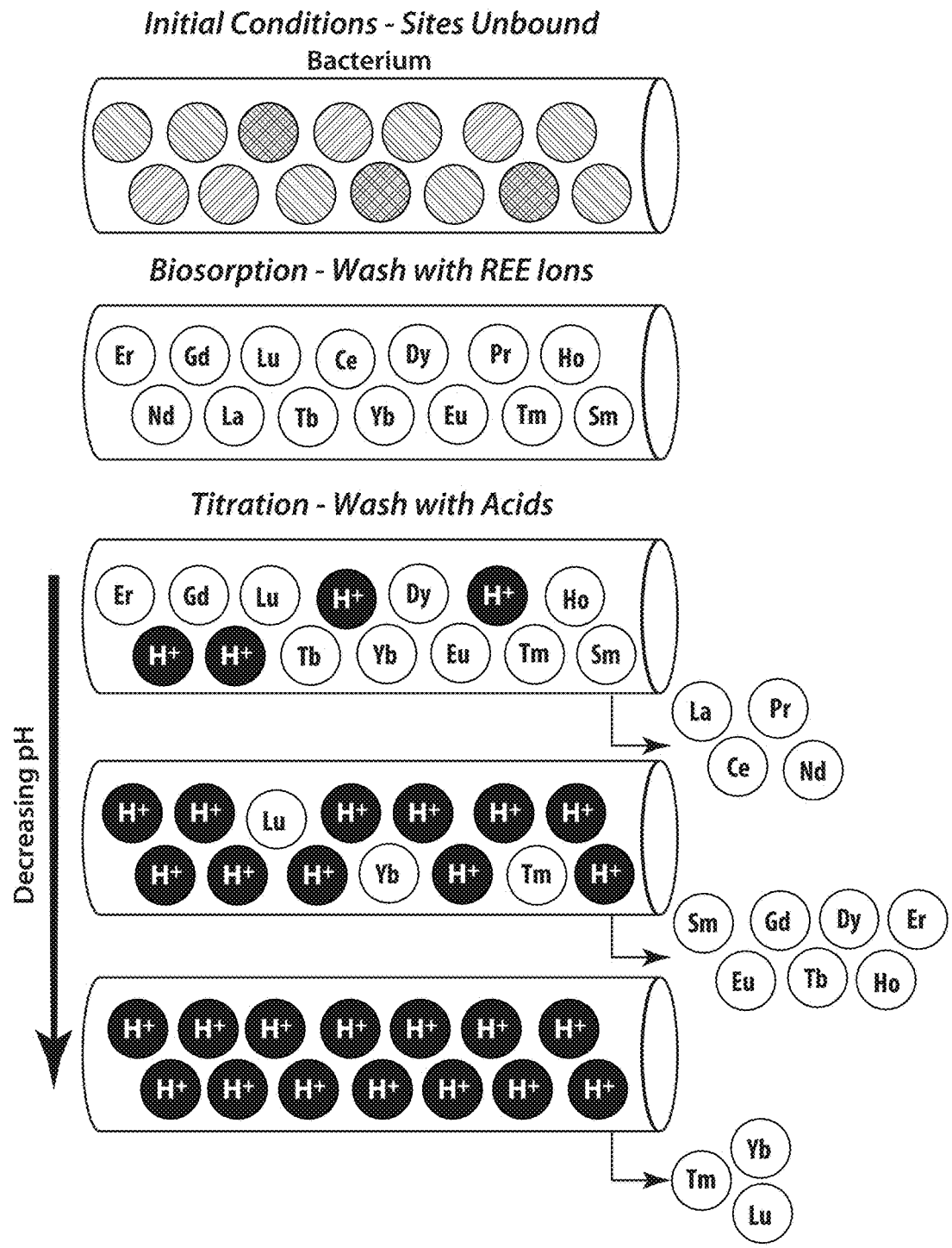
FIG. 15A-15B illustrate REE separation in another embodiment of the invention.
Figure 15B:
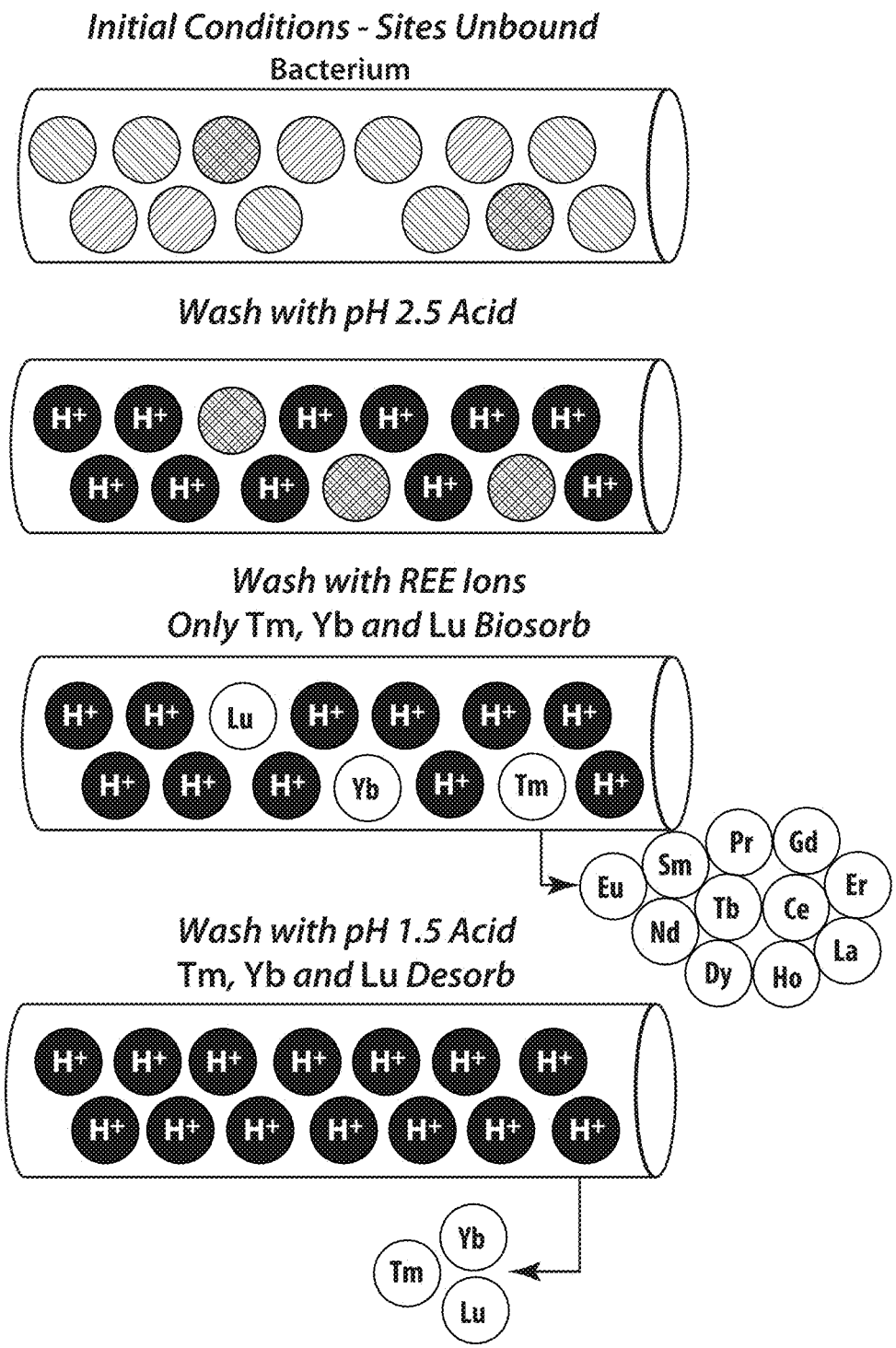
Figure 16:
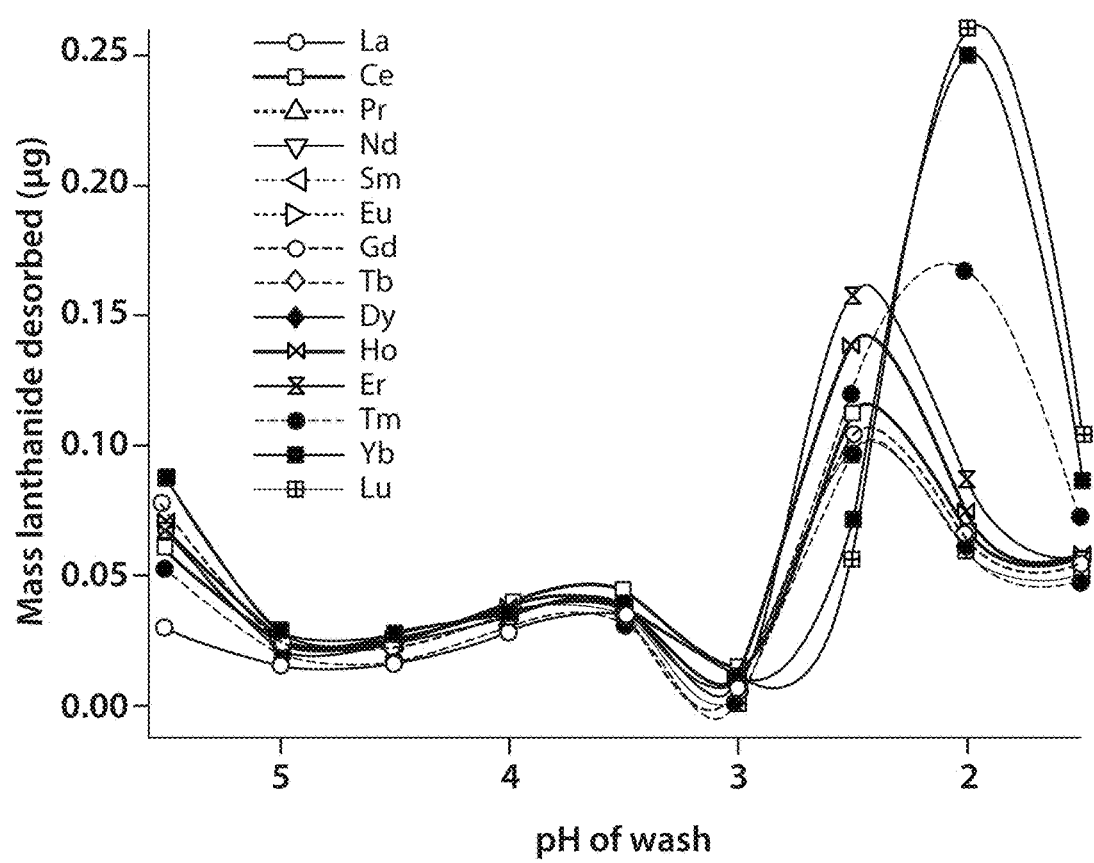
FIG. 16 illustrates separation using liposomes, in yet another embodiment of the invention.

FIG. 15 shows a hypothesized mechanism for REE separation by biosorption and pre-protonation in accordance with some embodiments of eth invention. The existence of lanthanide binding sites on the bacterial cell were observed. When a bacterial cell that has biosorbed lanthanides is washed with low pH solutions, the lanthanide binding sites desorb as a function of pH, thus separating the lanthanides based on the site to which the lanthanide was bound. If the bacterial cell is first washed with a low pH solution, certain binding sites will become protonated, and these occupied sites can not biosorb the lanthanides. When a lanthanide solution is passed by these cells, the free sites biosorb only select lanthanides, leading to enhanced separation. FIG. 15A) A bacterial cell with many different lanthanide binding sites biosorbs a mixture of lanthanides. Then, when washed with decreasing pH levels the lanthanides desorb differently as a function of pH. FIG. 15B) A bacterial cell with many different lanthanide binding sites biosorbs a low pH solution. Then, when the cell is washed with a mixed lanthanide solution, only specific lanthanides biosorb. The cell is then washed with an even lower pH, releasing all biosorbed lanthanides.

EXAMPLE 8

This example illustrates separation of rare earths using liposomes. A plot of lanthanide desorption vs. pH wash for filtration separation using liposomes. The liposomes were created from lipids with a phosphate head group (18:1, 1,2-dioleoyl-sn-glycero-3-phosphate); a phosphate head group was chosen because bacteria are known to have phosphate groups on their cells membranes. The liposomes were used as the adsorbant in the filtration method for lanthanide separation. The liposomes were adsorbed by the lanthanides, and then washed with decreasing pH nitric acid washes. Each nitric acid wash was analyzed by ICP-MS for the mass of lanthanide desorbed from the liposomes. The nitric acid wash with pH 2.5 is more abundant in the first 12 lanthanides by weight, while the nitric acid wash with pH 2 is more abundant in the 3 heaviest lanthanides. These differences in desorption among the lanthanides can be exploited for separation.

The following lipids, used to create the liposomes used in this example, were procured from Avanti Polar Lipids (Alabaster, Ala.): 18:1 PA, 1,2-dioleoyl-sn-glycero-3-phosphate (sodium salt) (25 mg in chloroform solution, part number: 840875C), 18:1 DGS, 1,2-dioleoyl-sn-glycero-3-succinate (25 mg in chloroform solution, part number: 870314C), 18:1 PS (DOPS) 1,2-dioleoyl-sn-glycero-3-phospho-L-serine (sodium salt) (10 mg in chloroform solution, part number: 840035), DSPE-PEG(2000) Succinyl 1,2-distearoyl-sn-glycero-3-phosphoethanolamine-N-[succinyl(polyethylene glycol)-2000] (ammonium salt) (10 mg in chloroform solution, part number 880121), and 10:0 PA 1,2-didecanoyl-sn-glycero-3-phosphate (sodium salt) (25 mg in chloroform solution, part number: 830843).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:
1. A method, comprising:
providing biomass comprising an initial molar ratio of a first rare earth to a second rare earth;

exposing the biomass to a first solution to cause the first solution to have a first molar ratio of first rare earth to second rare earth;

removing at least a portion of the first solution; and exposing the biomass to a second solution different from the first solution to cause the second solution to have a second molar ratio of first rare earth to second rare earth, wherein the first solution has a first pH that is less than or equal to about 2.5 and the second solution has a second pH different from the first pH.

2. The method of claim 1, wherein the concentration of ions in the second solution is greater than the concentration of ions in the first solution.

3. The method of claim 1, wherein the first molar ratio and the second molar ratio are each greater than the initial molar ratio.

4. The method of claim 1, wherein the first molar ratio is greater than the second molar ratio.

5. The method of claim 1, wherein the second molar ratio is less than the initial molar ratio.

6. The method of claim 1, wherein the first and second rare earths are each independently selected from the group consisting of Sc, Y, La, Ce, Pr, Nd, Pm, Sm, Eu, Gd, Tb, Dy, Ho, Er, Tm, Yb, and Lu.

7. The method of claim 1, wherein the biomass comprises bacteria.

8. The method of claim 1, wherein the biomass comprises an exopolysaccharide.

9. The method of claim 1, wherein the biomass comprises lignin.

10. The method of claim 1, wherein the first and second rare earths associate with the surface of the biomass.

11. The method of claim 1, wherein the difference in atomic number between the first rare earth and the second rare earth is less than or equal to 3.

12. The method of claim 1, further comprising exposing the biomass to an acid prior to exposing the biomass to the first solution to produce the biomass comprising the initial molar ratio of the first rare earth to the second rare earth.

13. The method of claim 12, wherein the acid has a pH different from the second pH of the second solution.

14. The method of claim 1, further comprising passing the at least a portion of the first solution comprising the first molar ratio of first rare earth and second rare earth through a plurality of stages, wherein in at least some of the stages, the rare earths are exposed to one or more biomasses that have a greater affinity for the second rare earth than the first rare earth; and recovering, from the plurality of stages, an exiting solution having an increased molar ratio of first rare earth to the second rare earth relative to the first solution.

15. The method of claim 1, further comprising exposing at least a portion of the first solution to a second biomass.

* * * * *